US008825673B2

(12) United States Patent
Ravid et al.

(10) Patent No.: US 8,825,673 B2
(45) Date of Patent: Sep. 2, 2014

(54) METHOD FOR ORGANIZING LARGE NUMBERS OF DOCUMENTS

(75) Inventors: Yiftach Ravid, Rosh Haayin (IL); Amir Milo, Kfar Saba (IL)

(73) Assignee: Equivio Ltd., Rosh HaAyin (IL)

(*) Notice: Subject to any disclaimer, the term of this patent is extended or adjusted under 35 U.S.C. 154(b) by 227 days.

(21) Appl. No.: 12/667,664

(22) PCT Filed: Jul. 2, 2008

(86) PCT No.: PCT/IL2008/000912
§ 371 (c)(1),
(2), (4) Date: Jan. 4, 2010

(87) PCT Pub. No.: WO2009/004624
PCT Pub. Date: Jan. 8, 2009

(65) Prior Publication Data
US 2010/0198864 A1 Aug. 5, 2010

Related U.S. Application Data

(63) Continuation-in-part of application No. 11/968,433, filed on Jan. 2, 2008, now abandoned.

(60) Provisional application No. 60/947,606, filed on Jul. 2, 2007, provisional application No. 60/974,974, filed on Sep. 25, 2007.

(51) Int. Cl.
G06F 17/30 (2006.01)
G06F 17/22 (2006.01)
H04L 12/58 (2006.01)

(52) U.S. Cl.
CPC ...... G06F 17/30705 (2013.01); G06F 17/2211 (2013.01); H04L 51/16 (2013.01)
USPC ............ 707/749; 707/692; 707/711; 715/752

(58) Field of Classification Search
CPC ... H04L 51/16; H04L 12/58; G06F 17/30864; G06F 17/2211; G06F 17/3071; G06F 11/1453; G06F 17/2775; G06F 17/3002; G06F 17/30598
USPC ............ 707/1, 100, 769, 692, 711, 736, 749, 707/758, 797, 804; 715/752
See application file for complete search history.

(56) References Cited

U.S. PATENT DOCUMENTS 6,064,952 A  5/2000  Imanaka et al.
6,119,124 A  9/2000  Broder et al.
(Continued)

OTHER PUBLICATIONS

International Preliminary Report on Patentability issued in International Patent Application No. PCT/IL08/00912 dated Apr 27, 2010.
(Continued)

Primary Examiner — Jay Morrison
Assistant Examiner — Dangelino Gortayo
(74) Attorney, Agent, or Firm — Oliff PLC

(57) ABSTRACT

A computer product including a data structure for organizing of a plurality of documents, and capable of being utilized by a processor for manipulating data of the data structure and capable of displaying selected data on a display unit. The data structure includes a plurality of directionally interlinked nodes, each node being associated with one or more documents having a header and body text. All the documents are associated with a given node and have identical normalized body text. All documents that have identical normalized body text are associated with the same node. One or more of the nodes is associated with more than one document. For any node that is a descendent of another node, the normalized body text of each document associated with the node is inclusive of the normalized body text of a document that is associated with the other node.

18 Claims, 21 Drawing Sheets

(56) References Cited

U.S. PATENT DOCUMENTS

| | | | |
|---|---|---|---|
| 6,189,002 B1 | 2/2001 | Roitblat | |
| 6,230,155 B1 | 5/2001 | Broder et al. | |
| 6,240,409 B1 * | 5/2001 | Aiken | 707/999.003 |
| 6,349,296 B1 | 2/2002 | Broder et al. | |
| 6,380,034 B1 | 4/2002 | Vajana et al. | |
| 6,654,739 B1 | 11/2003 | Apte et al. | |
| 6,658,423 B1 * | 12/2003 | Pugh et al. | 707/999.003 |
| 6,751,628 B2 | 6/2004 | Coady | |
| 6,772,165 B2 | 8/2004 | O'Carroll | |
| 7,035,876 B2 | 4/2006 | Kawai et al. | |
| 7,039,856 B2 | 5/2006 | Peairs et al. | |
| 7,051,277 B2 | 5/2006 | Kephart et al. | |
| 7,139,756 B2 | 11/2006 | Cooper et al. | |
| 7,266,548 B2 | 9/2007 | Weare | |
| 7,280,957 B2 | 10/2007 | Newman et al. | |
| 7,340,674 B2 | 3/2008 | Newman | |
| 7,359,936 B2 * | 4/2008 | Gruen et al. | 709/203 |
| 7,516,186 B1 * | 4/2009 | Borghetti et al. | 709/206 |
| 7,519,589 B2 | 4/2009 | Charnock et al. | |
| 7,519,903 B2 | 4/2009 | Yahagi | |
| 7,577,656 B2 * | 8/2009 | Kawai et al. | 707/999.007 |
| 7,613,602 B2 | 11/2009 | Kanawa | |
| 7,660,819 B1 * | 2/2010 | Frieder et al. | 707/999.107 |
| 7,912,904 B2 * | 3/2011 | Buchheit et al. | 709/206 |
| 7,930,353 B2 | 4/2011 | Chickering et al. | |
| 7,954,151 B1 | 5/2011 | Nisbet et al. | |
| 8,015,162 B2 * | 9/2011 | Henzinger | 707/692 |
| 8,131,722 B2 | 3/2012 | Sundaresan et al. | |
| 8,140,505 B1 * | 3/2012 | Jain et al. | 707/706 |
| 2002/0073157 A1 | 6/2002 | Newman et al. | |
| 2005/0060643 A1 | 3/2005 | Glass et al. | |
| 2006/0112108 A1 | 5/2006 | Eklund et al. | |
| 2006/0112120 A1 | 5/2006 | Rohall | |
| 2006/0190830 A1 | 8/2006 | Gerstl et al. | |
| 2006/0271530 A1 | 11/2006 | Bauer | |
| 2007/0208762 A1 * | 9/2007 | Lunt et al. | 707/100 |
| 2008/0052633 A1 | 2/2008 | Kubo et al. | |
| 2009/0282086 A1 * | 11/2009 | Heimes | 707/200 |

OTHER PUBLICATIONS

Office Action issued in U.S. Appl. No. 11/968,433 dated Sep. 17, 2010.

Conrad et al., "Online Duplicate Document Detection: Signature Reliability in a Dynamic Retrieval Environment," CIKM 2003, pp. 443-452.

Collins-Thompson et al., "A Clustering-Based Algorithm for Automatic Document Separation," 2002, pp. 1-6.

Chowdhury, "Duplicate Data Detection," Nov. 7, 2007, pp. 1-8.

Tomasic et al., "Incremental Updates of Inverted Lists for Text Document Retrieval," Short Version of Stanford University Computer Science Technical Note STAN-CS-TN-93-1, Dec. 9, 1993, pp. 1-25.

International Search Report issued in International Application No. PCT/IL2008/000912; Dated Nov. 19, 2008.

Office Action issued in U.S. Appl. No. 12/839,976 dated Sep. 29, 2011.

Jul. 10, 2013 Office Action issued in U.S. Appl. No. 12/839,976.

* cited by examiner

Figure 1a

| From: Andy Anderson | Date: 6:35 PM, 25 July 2006 |
| To: Bill | Subject: Old House?? |

Hey Bill!

Are you available on Thursday? I'd like to go back to the Old House with Charlie.

Miss ya!

Andy

Figure 1b

| From: Bill | Date: 2:22 PM, 26 July 2006 |
| To: Andy Anderson | Subject: Re: Old House?? |

Andy—

I can manage. 2pm. Did you check with Charlie?

See you Thursday
Bill

>Date: Sun, 25 July 2006 15:23 +0300
>To: Bill@boxmail.com,
>From: Andy Anderson <Andy.anderson@013.com>
>Subject: Old House??
>
>Hey Bill!
>
>Are you available on Thursday? I'd like to go back to the Old >House with Charlie.
>
>Miss ya!
>
>Andy

Figure 1c

From: Andy Anderson
To: Charles
Cc: Bill

Date: 8:41 AM, 27 July 2006
Subject: Fw: Re: Old House??

---

Charlie

Please let me know ASAP if you're going to manage.

Andy

--- begin forwarded text

Date: Mon, 26 July 2006 11:28:29 +0300
From: Bill <Bill@boxmail.com>
To: Andy <Andy.anderson@013.com>
Subject: Re: Old House??

MIME-Version: 1.0

Andy—

I can manage. 2pm. Did you check with Charlie?

See you Thursday
Bill

>Date: Sun, 25 July 2006 15:42:23 +0300
>To: Bill@boxmail.com,
>From: Andy Anderson <Andy.anderson@013.com>
>Subject: Old House??
>
>Hey Bill!
>
>Are you available on Thursday? I'd like to go back to the Old
>House with Charlie.
>
>Miss ya!
>
>Andy

Figure 3

| Step | Description | |
|---|---|---|
| 301 | Given an e-mail, set a unique identifier (DocID) to it, set idx = 0 | |
| 302 | Create a field MailID, Set MailID=DocID | |
| 303 | Store e-mail information using the key (docID, mailID, idx) in a database repository | |
| 304a | Consider To, CC, BCC, Sent time, Internet Message ID, In Reply Message ID, Subject as e-mail header | |
| 304b | Parse the e-mail header for From, To, CC, BCC, Sent time, Internet Message ID, In Reply Message ID, Subject, Body, attachments. Store parsed information in database | |
| 305 | Normalize the Subject and compute a CRC – MD5 on the normalized subject (Nsubject). Store both the subject and the CRC of the normalized subject. | |
| 306 | Calculate CRC on the normalized body (Nbody) | |
| 307 | If the combined CRC exists in the repository go to the next document Otherwise, | |
| 308 | 308a | Try to find the sequential message in the document |
|  | 308b | If found, set unique DocId, set MailID = MailID of document from which it is derived, and set Idx = idx + 1. |
|  | 308c | Go to (3) |
|  | 308d | Otherwise, go to the next document. |

*Figure 5a*

| Step | Description |
|------|-------------|
| 501 | For each document compute the NodeID. The NodeID of a document is the minimum value of DocID – of all documents that have same BODY CRC and NSUBJECT CRC |
| 502 | Initialize ParentNodeID to -1, for all documents. For each document compute its ParentNodeID. ParentNodeID is the parent of the NodeID. Identify a Parent for each NodeID by finding a document with the same MailID as the NodeID plus a MailIdx difference of -1. For example for document 120, its parent is identified as document 130 because it has the same MailID, and a MailIdx difference of -1. Document 210 has a NodeID of 120, so its ParentNodeID is also 130. |
| 503 | Initialize TreeID as the MailID of all documents. Update the Tree ID of each document to the TreeID of its ParentNodeID. |
| 504 | Union EquiSet, associating trees to a Document Set, if the trees each contain a near-duplicating node. |
| 505 | Set the TreeID as the minimum NodeID of the tree. |

*Figure 8d*

| Inclusive Documents | Included documents |
|---|---|
| c | a,b,d,f |
| e | a,b,d,f |

*Figure 8e*

| Documents | Node Address | Inclusive? |
|---|---|---|
| a | 10.10 | |
| b | 10.10.11 | |
| c | 10.10.11.12 | Inclusive |
| d | 10.10.11 | |
| e | 10.10.11.13 | Inclusive |
| f | 10.10.11 | |

| DocId | Document | Node Address | EquiSortAttach | Inclusive |
|---|---|---|---|---|
| 1 | a | 10.10 | 10.10#1.A.1 | |
| 2 | b | 10.10.11 | 10.10.11#2.A.2 | |
| 3 | b | 10.10.11 | 10.10.11#2.C.3 | |
| 4 | b | 10.10.11 | 10.10.11#2.C.4 | |
| 5 | b | 10.10.11 | 10.10.11#2.C.5 | |
| 6 | c | 10.10.11.12 | 10.10.11.12#6.A.6 | Inclusive |
| 7 | d | 10.10.11 | 10.10.11#7.A.7 | |
| 8 | d | 10.10.11 | 10.10.11#7.C.8 | |
| 9 | d | 10.10.11 | 10.10.11#7.C.9 | |
| 10 | d | 10.10.11 | 10.10.11#7.C.10 | |
| 11 | e | 10.10.11.13 | 10.10.11.13#13.A.13 | Inclusive |
| 12 | f | 10.10.11 | 10.10.11#12.A.12 | |
| 13 | f | 10.10.11 | 10.10.11#12.C.13 | |
| 14 | f | 10.10.11 | 10.10.11#12.C.14 | |
| 15 | f | 10.10.11 | 10.10.11#12.C.15 | |

*Figure 8f*

METHOD FOR ORGANIZING LARGE NUMBERS OF DOCUMENTS

CROSS-REFERENCE TO RELATED APPLICATIONS

This application claims the benefit of U.S. Provisional Application No. 60/974,974 filed on Sep. 25, 2007, and U.S. Provisional Application No. 60/947,606 filed on Jul. 2, 2007, and U.S. patent application Ser. No. 11/968,433 all of which are hereby incorporated by reference herein.

FIELD OF THE INVENTION

The present invention relates to the field of organizing large numbers of documents.

BACKGROUND OF THE INVENTION

In litigation proceedings, as well as for other functions, often massive amounts of documents must be reviewed. Certain organizational methods for arranging documents exist in the art. Emails are a particular type of document that are useful to review in structures, to help make sense of the proceedings and reduce the number of documents that need to be read.

The need to detect near duplicate documents arises in many applications. Typically this may occur in litigation proceedings. In litigation, often one of the parties initiates discovery proceedings which force the rival party to reveal all the documents at his disposal that pertain to the legal dispute. In order to meet the provisions of the discovery procedure, the disclosing party hands piles of documents, sometimes in order to duly meet the full disclosure stipulations, or in certain other cases, as a tactical measure to flood the other party with huge amounts of documents, thereby incurring the receiving party considerable legal expenses in the tedious task of determining which documents are relevant to the dispute under consideration. In many cases, out of the repertoire of disclosed documents, many are similar to each other. A preliminary knowledge which will group and/or flag documents that are similar to one another would streamline the screening process, since for example, if a certain document is classified as irrelevant, then probably all the documents that are similar thereto, are also deemed irrelevant. There are numerous other applications for determining near duplicate documents, sometimes from among a very large archive of documents (possibly of the order of millions of documents or more).

A common type of document that is examined in litigation procedures is emails. If collected from user accounts of various users in a company, there is likely to be a degree of duplicity between users. Duplicity may occur because the same email is sent to a number of recipients at once, or for other reasons. Also, many times, emails are near duplicates of one another.

LIST OF RELATED ART

U.S. Pat. No. 7,035,876 to Kawai et al provides a system and method for evaluating a structured message store for message redundancy. A header and a message body are extracted from each of a plurality of messages maintained in a structured message store. A substantially unique hash code is calculated over at least part of the header and over the message body of each message. The messages are grouped by the hash codes. One such message is identified as a unique message within each group. In a further embodiment, the messages are grouped by conversation thread. The message body for each message within each conversation thread group is compared. At least one such message within each conversation thread group is identified as a unique message. The invention requires that all emails in a set have the same subject line. Additionally, all emails must have the same attachment to be considered part of the same set.

U.S. Pat. No. 6,119,124: Method for clustering closely resembling data objects. A computer-implemented method determines the resemblance of data objects such as Web pages. Each data object is partitioned into a sequence of tokens. The tokens are grouped into overlapping sets of the tokens to form shingles. Each shingle is represented by a unique identification element encoded as a fingerprint. A minimum element from each of the images of the set of fingerprints associated with a document under each of a plurality of pseudo random permutations of the set of all fingerprints, are selected to generate a sketch of each data object. The sketches characterize the resemblance of the data objects. The sketches can be further partitioned into a plurality of groups. Each group is fingerprinted to form a feature. Data objects that share more than a certain numbers of features are estimated to be nearly identical.

U.S. Pat. No. 6,189,002: Process and system for retrieval of documents using context-relevant semantic profiles. A process and system for database storage and retrieval are described along with methods for obtaining semantic profiles from a training text corpus, i.e., text of known relevance, a method for using the training to guide context-relevant document retrieval, and a method for limiting the range of documents that need to be searched after a query. A neural network is used to extract semantic profiles from text corpus. A new set of documents, such as World Wide Web pages obtained from the Internet, is then submitted for processing to the same neural network, which computes a semantic profile representation for these pages using the semantic relations learned from profiling the training documents. These semantic profiles are then organized into clusters in order to minimize the time required to answer a query. When a user queries the database, i.e., the set of documents, his or her query is similarly transformed into a semantic profile and compared with the semantic profiles of each cluster of documents. The query profile is then compared with each of the documents in that cluster. Documents with the closest weighted match to the query are returned as search results.

U.S. Pat. No. 6,230,155: Method for determining the resemblance of documents. Disclosed is a method for facilitating the comparison of two computerized documents. The method includes loading a first document into a random access memory (RAM), loading a second document into the RAM, reducing the first document into a first sequence of tokens, reducing the second document into a second sequence of tokens, converting the first set of tokens to a first (multi)set of shingles, converting the second set of tokens to a second (multi)set of shingles, determining a first sketch of the first (multi)set of shingles, determining a second sketch of the second (multi)set of shingles, and comparing the first sketch and the second sketch. The sketches have a fixed size, independent of the size of the documents. The resemblance of two documents is provided, using a sketch of each document. The sketches may be computed fairly fast and given two sketches, the resemblance of the corresponding documents can be computed in linear time in the size of the sketches.

U.S. Pat. No. 6,240,409: Method and apparatus for detecting and summarizing document similarity within large document sets. A method and apparatus are disclosed for comparing an input or query file to a set of files to detect similarities and formatting the output comparison data are described. An input query file that can be segmented into multiple query file substrings is received. A query file substring is selected and used to search a storage area containing multiple ordered file substrings that were taken from previously analyzed files. If the selected query file substring matches any of the multiple ordered file substrings, match data relating to the match between the selected query file substring and the matching ordered file substring is stored in a temporary file. The matching ordered file substring and another ordered file substring are joined if the matching ordered file substring and the second ordered file substring are in a particular sequence and if the selected query file substring and a second query file substring are in the same particular sequence. If the matching ordered file substring and the second query file substring match, a coalesced matching ordered substring and a coalesced query file substring are formed that can be used to format output comparison data.

U.S. Pat. No. 6,349,296: Method for clustering closely resembling data objects. A computer-implemented method determines the resemblance of data objects such as Web pages. Each data object is partitioned into a sequence of tokens. The tokens are grouped into overlapping sets of the tokens to form shingles. Each shingle is represented by a unique identification element encoded as a fingerprint. A minimum element from each of the images of the set of fingerprints associated with a document under each of a plurality of pseudo random permutations of the set of all fingerprints, are selected to generate a sketch of each data object. The sketches characterize the resemblance of the data objects. The sketches can be further partitioned into a plurality of groups. Each group is fingerprinted to form a feature. Data objects that share more than a certain numbers of features are estimated to be nearly identical.

U.S. Pat. No. 6,658,423: Detecting duplicate and near-duplicate files. Disclosed is an improved duplicate and near-duplicate detection. Techniques may assign a number of fingerprints to a given document by (i) extracting parts from the document, (ii) assigning the extracted parts to one or more of a predetermined number of lists, and (iii) generating a fingerprint from each of the populated lists. Two documents may be considered to be near-duplicates if any one of their respective fingerprints match.

U.S. Pat. No. 6,654,739: Lightweight document clustering is a procedure for clustering documents that operates in high dimensions, processes tens of thousands of documents and groups them into several thousand clusters or, by varying a single parameter, into a few dozen clusters. The procedure is specified in two parts: computing a similarity score representing the k most similar documents (typically the top ten) for each document in the collection, and grouping the documents into clusters using the similar scores.

U.S. Pat. No. 6,751,628: Process and system for sparse vector and matrix representation of document indexing and retrieval. Disclosed is a new data structure and algorithms which offer at least equal performance in common sparse matrix tasks, and improved performance in many. This is applied to a word-document index to produce fast build and query times for document retrieval.

U.S. Pat. No. 7,139,756: System and method for detecting duplicate and similar documents. A system and a method are described for rapidly determining document similarity among a set of documents, such as a set of documents obtained from an information retrieval (IR) system. A ranked list of the most important terms in each document is obtained using a phrase recognizer system. The list is stored in a database and is used to compute document similarity with a simple database query. If the number of terms found to not be contained in both documents is less than some predetermined threshold compared to the total number of terms in the document, these documents are determined to be very similar. It is shown that these techniques may be employed to accurately recognize that documents, that have been revised to contain parts of other documents, are still closely related to the original document. These teachings further provide for the computation of a document signature that can then be used to make a rapid comparison between documents that are likely to be identical.

Abdur Chowdhury Duplicate Data Detection The algorithm is based on IDF of the tokens. The algorithm steps are: 1. Get document. 2. Parse document into a token steam, removing format tags. 3. Using term thresholds (idf), retain only significant tokens. 4. Insert relevant tokens into Unicode ascending ordered tree of unique tokens. 5. Loop through token tree and add each unique token to the SHA1 (1995) digest. Upon completion of token tree loop, a (doc_id, SHA1 Digest) tuple is defined. 6. The tuple (doc_id, SHA1 Digest) is inserted into the storage data structure based on SHA1 Digest key. 7. If there is a collision of digest values, then the documents are similar. Conrad et. Al: In a series of a few papers, they describe a method that is based on the IDF measure of tokens, and the size of the documents. They are also provided a method of selecting the corpus to evaluate the IDF of a token.

There is thus a need in the art to provide for a new system and method for determining near duplicate objects. There is still further need in the art to provide for a new system and method for determining near duplicate documents.

SUMMARY OF THE INVENTION

The present invention relates to the organization and display of data, particularly when the source of the data is a huge number of documents.

According to an aspect of the invention, there is provided a computer product including a data structure for organizing of a plurality of documents, and capable of being utilized by a processor for manipulating data of the data structure and capable of displaying selected data on a display unit. The data structure comprises:

a) a plurality of directionally interlinked nodes, each node being associated with at least one document having at least a header and body text; and wherein all documents associated with a given node having substantially identical normalized body text, and wherein all documents having substantially identical normalized body text being associated with the same node, and wherein at least one node being associated with more than one document;

b) for any first node of the nodes that is a descendent of a second node of the nodes, the normalized body text of each document associated with the first node is substantially inclusive of the normalized body text of each document that is associated with the second node.

According to a further embodiment of the invention, all documents associated with a given node further have substantially identical normalized subject parameter in the header.

According to a further embodiment of the invention, there is provided that the body text of each document associated with said first node is substantially inclusive of the body text of each document that is associated with said second node, irrespective of whether a normalized subject parameter from a header of a document associated with said first node and a normalized subject parameter from a header of a document associated with said second nodes are identical.

According to another aspect of the invention, there is provided a method for organizing documents into nodes, in which a node represents a group of substantially equivalent documents. The method comprises:

(i) providing a plurality of original documents, each comprising a header and a body, and wherein the header comprises at least one parameter and wherein the body comprises text, (ii) selecting a document from among the documents and associating the document with a node, comparing at least a portion of the body text of the document to at least a portion of the body texts of other documents from amongst the plurality of documents, and in the case of a match, merging the node associated with the document with a node associated with the matching document, (iii) searching the body of the document to locate a first instance of header-type text, wherein the header-type text contains at least one header parameter;

(iv) constructing a presumed document comprising a header and a body, wherein the header of the presumed document comprises one or more parameters from the header-type text located within the body of the original document, and wherein the body of the presumed document substantially comprises the text located after the header-type text in the body of the original document, and associating the presumed document with a node;

(v) comparing at least a portion of the body text of the presumed document to at least a portion of the body texts of at least one other documents from among the plurality of documents and in the case of a match, merging a node associated with the presumed document with a node associated with the matching document, (vi) if the comparison of (v) does not find a match, processing repeatedly the remainder of the body of the document for successive instances of header-type text, as stipulated in stages (iii)-(v), and for each instance, constructing a presumed document, comparing for any matching documents to the presumed document, and if found, merging the nodes associated with the matching documents, until no new presumed documents are found.

According to another aspect of the invention, a method is provided for reducing duplicate document display of a large number of documents, in which the method involves:

a) comparing a fingerprint of a document with previously stored document fingerprints, wherein a fingerprint is formed for each of at least a portion of the normalized body text and a normalized subject parameter of a document, wherein the comparison for detecting and indicating duplicating documents;

b) searching the document for instances of header-type text, searching in text order through the normalized body text of the document, and if header-type text is found in the search, i) deriving a presumed document comprising a header and a body text, by treating parameters from the instance of header-type text in the document as parameters of a header for the presumed document, and by treating all ensuing body text as the body text of the presumed document, and applying step a) to the presumed documents, and ii) if the fingerprint of the presumed document is unique, continuing to search the normalized body text of the document from which the presumed document is derived for further instances of header-type text, searching in text order through the normalized body text of the document, and if a further instance of header-type text is found in the search, applying step i) to derive and process an additional presumed document, and iii) repeating step ii) until no more instances of header-type text are found.

In an embodiment of the invention, the method described above also involves providing a plurality of nodes, and associating each document having a unique fingerprint with a unique node, and associating each document detected as duplicating to a prior document with the node associated with the prior document.

In an embodiment of the invention, the method described above also involves linking nodes to provide that a node associated with a first presumed document becomes the parent of the node associated with the document from which the first presumed document is derived, and to provide that the node associated with each sequentially derived presumed document derived from the same document becomes a parent of the node associated with the previously derived presumed document.

In an embodiment of the invention, the method described above also involves displaying the nodes in a computer format, and affiliating each node with the body text and subject parameter of the document associated with the node.

According to another aspect of the invention, there is provided a computer product including a data structure for organizing of a plurality of documents, and capable of being utilized by a processor for manipulating data of the data structure and capable of displaying selected data on a display unit. The data structure comprises one or more trees, wherein a tree comprises at least a trunk and at least one node, each node being associated with a document having at least a header and body text, and wherein a trunk being associated with zero or more documents having at least a header and a body text and wherein all documents whose body text includes the same included document are associated with the same tree, and wherein a unique inclusive document, as well as documents that duplicate to said unique inclusive document, are associated with one of one or more unique nodes of said tree, and wherein an included document, as well as documents that duplicate to said included document, are associated with the trunk of the tree.

BRIEF DESCRIPTION OF THE DRAWINGS

In order to understand the invention and to see how it may be carried out in practice, an example embodiment will now be described, by way of non-limiting example only, with reference to the accompanying drawings, in which:

FIGS. 1a to 1c illustrate an example set of three emails;

FIG. 3 illustrates a first generalized flow diagram of operational stages in accordance with an embodiment of the invention;

FIGS. 5a-5c illustrate a second generalized flow diagram, with examples of operational stages in accordance with an embodiment of the invention;

FIGS. 8d-8f illustrate output forms in accordance with embodiments of the invention;

DETAILED DESCRIPTION OF THE INVENTION

Figure 2A:
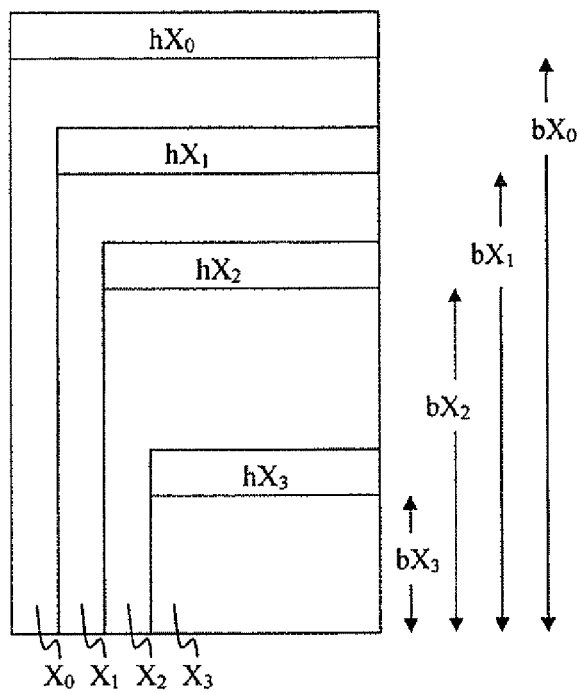
FIGS. 2a and 2b illustrate how an inclusive document, such as an email, may be expanded into a set of presumed documents, in accordance with an embodiment of the invention.

It should be noted that the invention is described for convenience, with reference to documents. The term documents is understood to include files including text or representing text, such as Microsoft Word documents, Excel documents, mail documents, etc. References to documents embrace also derivative thereof, such as known per se canonic representation of a document. In accordance with certain embodiments, documents include at least text and/or numbers. In one embodiment, the documents are Microsoft Office® documents, such as e-mails in selected format. The format may be, for example, Microsoft Outlook, Lotus Notes, etc. The term documents is not confined to obvious documents, but applies also to other types of data objects, such as documents within a ZIP file, e-mails in MS Outlook PST file format, attachments, etc.

In the following detailed description, numerous specific details are set forth in order to provide a thorough understanding of the invention. However, it will be understood by those skilled in the art, that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions, utilizing terms such as, "processing", "comparing", "linking", "connecting", "representing", "detecting", "searching", "deriving", "calculating", "storing", "inserting", "determining", "treating", "repeating", "identifying", "labeling", "indexing", "running an algorithm", "to return, if positive . . . if negative . . . ", "creating", "showing", "displaying", "suppressing", "setting levels", "stringing nodes", "organizing", "associating", "affiliating", or the like, refer to the action and/or processes of a computer or computing system, or processor or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may use terms such as processor, computer, apparatus, system, sub-system, module, unit and device (in single or plural form) for performing the operations herein. Devices may be specially constructed for the desired purposes, or the invention may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMS) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes/devices (or counterpart terms specified above) and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, the present invention is not limited to any particular programming language or type. It will be appreciated that a variety of programming languages may be used to implement the teachings of the inventions as described herein.

The following description seeks to explain by way of example what inclusiveness is, in relation to emails. With reference now to FIGS. 1a-1c, a set of three example emails are illustrated. FIG. 1a illustrates a first email. The email includes header 11 and body text 21. Header 11 contains metadata for the document, that in this case includes To: and From: fields, a date of transmission, and a Subject: field, or "subject" parameter. Parameters from header 11 indicate that the email was sent by Andy, to Bill on Sunday. Subject parameters are often related to body text, in the present email, the subject parameter is the words "Old House".

FIG. 1b illustrates a second email. The email includes header 12 and body text 22. Header 12 indicates that the email has been sent as a reply to Andy, from Bill, on Monday. Body text 22 includes new text from Bill, some metadata regarding the email of FIG. 1a, and a copy of body text 21. Each line of text, from the metadata until the end of the included body text 21, is prefaced by a ">" character.

FIG. 1c illustrates a third email. Header 13 indicates that it has been forwarded by Andy to Charles on Tuesday, with a carbon copy sent to Bill. Body text 23 includes new text from Andy, a line stating that forwarded text is beginning, metadata regarding Bill's forwarded email, and a copy of body text 22.

As has been noted, body text 23 is inclusive of body text 22, which is inclusive of body text 21. Thus, if one wished to read the minimum number of texts, one could suffice by reading only body text 23. A meaning of the term 'inclusive document' in the present context is directed to one document from amongst a group of documents, in which the inclusive one includes the text (or the normalized text) of all the others. In the set of documents of FIG. 1, FIG. 1c would be considered the inclusive document of the three, since its body text 23 includes all the body text of the other two. Similarly, FIG. 1b can be considered inclusive of FIG. 1a, since body text 22 includes all the text of body text 21.

It will be noted in certain embodiments, when determining inclusiveness, that a first document is only considered inclusive of a second document if the first document contains within its body text the entire body text of the second document. However, a document can still be considered inclusive if certain minor differences are present, such as for example, normalization having been applied, or legal disclaimers at the end of an email having been stripped, or only a certain number of lines or characters of the body text are considered as significant.

Having described what inclusiveness represents, with relation to emails, the following describes arrangement of documents, such as emails, according to inclusiveness. In accordance with certain embodiments of the present invention, there is provided a method for arranging a large number of documents relative to one another. Documents can be any type of document, but a particular usage of the present invention relates to emails. Documents may be loosely described as including both "body text" and "metadata". Body text refers to the viewable text of the document, while metadata (also referred to herein as the document "header") includes information and fields concerning the document, for example the fields for: author, date of creation, subject, date modified, etc. With regard to emails, which are anticipated to be a particularly useful beneficiary of the present invention, a great deal of information is stored as metadata for each email, often including the above fields, and others, application specific, such as Conversation ID (in Microsoft Outlook). The header of each email displays some of the metadata for the email, for example header 11 includes From: and To: fields, as well as Date: (date sent) and Subject: fields.

Emails may very often be inclusive documents. As shown in FIG. 1, it is common for people to respond to emails by hitting the reply or forward button at the top of the email program screen. This action prepares for them a new email, with some or all header fields already filled in, and provides all the body text of the email being responded to, in the body of message. Usually this included body text is preceded by some sort of header-type text to indicate what it is. An example of header-type text is shown in FIG. 1b, where the header-type text is:

>Date: Sun, 25 July 2006 15:42:23 +0300
>To: Bill@boxmail.com,
>From: Andy Anderson <Andy.anderson@013.com>
>Subject: Old House??

When a few documents from amongst a large number of documents relate to the same subject matter, it is convenient to have them grouped together. Various organizational techniques are known in the art, such as classifying documents according to metadata associated with the documents, for example according to creation date of the document, or the author's name, or the subject line. In accordance with certain embodiments of the present invention, there is provided a method for grouping documents according to included documents.

The method for grouping and arranging documents according to inclusiveness can be applied with at least two different outputs:

1) A set of directionally interlinked nodes are created, in which each node is associated with at least one document. Each document has header parameters and body text, and if more than one document exists with the substantially identical body text, all are associated with the same node. In order to determine if documents are substantially identical, normalization is applied to the text, to remove any irrelevant characters. The level of normalization is variable, and no normalization is also considered normalization, since it represents an equal output to input. Large degrees of normalization are also possible, as described below. As stated, identical documents are associated with the same node, and, in many cases, many documents will all be associated with the same node. The nodes are directionally interlinked as follows. A first node is arranged or indicated to be a descendant of a second node if the body text of each document associated with the first node is substantially inclusive of the body text of each document that is associated with the second node.

The directionally interlinked nodes can be displayed by a processor on a display unit as a representational tree of nodes. The representational tree shows graphically the relationship between the nodes, indicating the degree of inclusiveness that each document associated with the nodes has relative to the others in the tree. So, in effect, the nodes of the tree graphically display the order of the documents, starting with the shortest one and leading to the longest, most inclusive document.

2) A group of documents that all include a certain document text is created. From this group, certain inclusive documents are identified as being inclusive of the others. In accordance with certain embodiments of the method, there is an advantage in that a reviewer can read all the text content of the entire group of documents by reading only the identified documents.

These two outputs are provided for exemplary purposes only, and should by no means be considered as limiting the scope of the invention.

In both of the above cases, it is noted that inclusiveness includes inclusiveness of whole documents, wherein a whole document has a header as well as body text. However, there are at least three cases in which documents are considered inclusive even though the body text of one is not wholly inclusive of the other. Firstly, normalization may have stripped the body text of part of the text. Secondly, if a first document is inclusive of a document that is near-duplicated to a second document, the first document is considered inclusive of the second document, and the node associated with the first document is a descendant of the second document. Thirdly, it may be desired to use only a portion of the body text for the purposes of determining inclusiveness. For example, one might want to consider only the first 2000 characters of all documents. Other variants besides the specified example are also applicable.

Both of these outputs will be described in more detail with reference to FIGS. 8b-8c.

A variety of methods may be used in order to group and arrange documents according to inclusiveness; the present disclosure will describe example methods, from which other equivalent methods can be extrapolated.

Documents and emails often indicate that other, previous, documents once existed. An example of this in FIG. 1b—for even without ever seeing FIG. 1a, FIG. 1a can be derived from FIG. 1b. One embodiment for the present invention includes the step of deriving, or reconstituting presumed emails from other emails. As mentioned, FIG. 1a can be derived from FIG. 1b, while both FIG. 1a and FIG. 1b can be derived from FIG. 1c. When a document such as an email is derived it is termed a "presumed document"—a document that is presumed to have existed due to its incorporation within another document. After a presumed document is created, it is then compared with other documents. If the presumed document is found to be identical with any other documents, then the document from which the presumed document is derived, and the document to which the presumed document is similar, are identified as belonging to the same group, or tree.

In one manner of implementation of the present invention, each document that is to be classified is first provided with identification. This identification is used in accordance with certain embodiments and is not required in other embodiments of the present invention; identification is a method that will be referred to later in this disclosure. The present example is used with reference to emails, but may be used with other types of documents.

A large number of emails are provided, so that they may be organized according to inclusiveness. Each email is first provided with three types of identification: an email number, (MailID), an index value (Idx), and an individual, unique document number (DocID). These may be entered into the data structure. The MailID is assigned according to the number of emails that have previously been processed, the index value is set at zero, and the DocID is identical to the MailID. The purpose of these latter two identifiers will be explained in greater detail below.

Emails, as mentioned, in many cases, are expandable into a set of presumed, or derived or secondary documents. With reference now to FIG. 2, an email is shown, in terms of general structure, and with email text content not shown, for clarity. Email text content may resemble that of FIG. 1e, for example. The email of FIG. 2 is separately recorded as having identification details as follows: MailID is set to X, DocID is set to X, and the index is zero. The email is referred to herein as Email $X_0$, in which X is the MailID and $_0$ represents the index value. In a real-life scenario, the letter X would preferably be replaced with a numeric identifier. Email $X_0$ consists of a header and a body, and these are labeled as header $hX_0$ and body text $bX_0$.

Presumed emails may be derived based on the appearance of header type text within the body text. For example, Body text $bX_0$ contains several instances of header-type text. Header-type text indicates that all the remaining text in the email, after the header-type text, is likely to have been originally the body text of an earlier document. Thus a presumed email can be created for each instance of header-type text. The first instance of header-type text indicates a presumed email, and this presumed email is provided with identification as follows: MailID remains X, DocID is a numeric string specific to this particular presumed email, and the index value is 1, implying that this is the first presumed email originating from the original email $X_0$. This first 'presumed document' is referred to herein as document $X_1$, and it consists of header $hX_1$ and body text $bX_1$. Body text $bX_1$ is derived from a copy of all the remaining body text following the header-type text identified as header $hX_1$ in document $X_0$.

The remaining text of body text $bX_0$, following the header-type text already located, can still be searched for further instances of header-type text, to create further presumed emails. A second instance of header-type text is found, to suggest a second presumed email, with identification as follows: MailID remains X, DocID is a numeric string specific to this particular presumed email, and the index is 2, implying that it is the second presumed email originating from document $X_0$. This second 'presumed email is referred to herein as $X_2$, and includes header $hX_2$, composed of the header-type text that caused it. All body text that follows header $hX_2$, namely body text $bX_2$, forms the body text for presumed email $X_2$.

The remaining text of body text $bX_0$ is also expandable, and a third instance of header-type text can be located. This forms presumed email $X_3$, with header $hX_3$ formed of the header-type text that indicated the presumed email, and with body text formed of all of body text that follows header $hX_3$, namely body text $bX_3$.

Figure 2B:
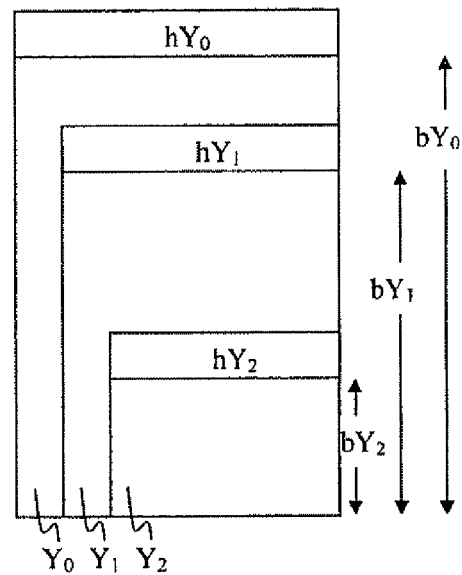

With reference now to FIG. 2b, Email $Y_0$ is also expandable into original document $Y_0$, plus two presumed emails, $Y_1$ and $Y_2$. $Y_1$ consists of header $hY_1$, and body text $bY_1$, while $Y_2$ consists of header $hY_2$ and body text $bY_2$. Headers $hY_1$ and $hY_2$ are composed of header-type text located in body text $Y_0$, in order of appearance respectively. Body texts $bY_1$ and $bY_2$ are composed of all of the text of body text $Y_0$ that followed the header-type texts of headers $hY_1$ and $hY_2$ respectively.

As has been shown, it is possible to 'expand' an email or other document into an email plus a set of presumed emails that were included within the body text. The set of presumed emails can then be used for comparison with other emails to determine which other emails should be considered in the same group. However, creating 'presumed documents' as described is only one way of implementing the present invention, and the organization of documents according to inclusiveness may be alternatively implemented in many other ways.

According to certain embodiments of the invention, documents whose contents have not been derived from within the body text of other documents of the set may be referred to herein as 'original documents', this term is relative to 'presumed documents' that have been derived from others. 'Original documents' however need not be true document originals, for example they may be extracted from bulk files or document copies.

Having described 'presumed documents' in accordance with certain embodiments, the following seeks to describe the process of preparing fingerprints (for example, CRC, implemented using MD5) of the documents. The fingerprints are prepared for the purpose of comparing original and presumed documents with other documents from the group of documents. Two documents that have the same fingerprints, have with high probability the same content.

In order to determine whether documents should belong to the same group—that one is inclusive of the other, or that two are identical to one another, a document comparison may be done. "Matching" and "equivalent" and "duplicating" are other terms that refer herein to two or more texts that are substantially identical.

According to one embodiment, a copy of each document that has been processed is stored in a repository, and as each new document is processed, it is compared with previously stored documents, before being stored itself. According to one embodiment, the repository is part of the data structure, or it may be a separate unit.

One implementation involves the following: the document in its entirety is not used for the comparison since it may be huge. Instead, only a fingerprint of the text of each document is compared. The fingerprint is created as follows. A first fingerprint, for example, a CRC (cyclic redundancy check), or for example, CRC-MD5, is compiled for the body text or the normalized body text of the document. A subject parameter is determined for the document, normalized and a second CRC is compiled for the normalized subject parameter. If the document is an email, the subject parameter may be derived from the Header parameter of the field labeled "Subject:". For example, in FIG. 1a, the subject parameter is the phrase: "Old House??". Other types of documents have other types of subject parameters, for example, the subject parameter may be a subject field filled in by a user when the document is created or modified, or it may be the title or file name or path of the document. It could be that a document has no subject field, or that the subject parameter is unknown. In accordance with certain embodiments, the subject parameter is a useful field for organizing documents. In accordance with other embodiments, the subject parameter is not used, for example, the present invention allows the subject parameter to be entirely disregarded, or disregarded only if empty, or alternatively, considered blank if it is unknown.

Fingerprints for the four documents $X_0$, $X_1$, $X_2$ and $X_3$, of FIG. 2a, are created, and are referred to herein as $dX_0$, $dX_1$, dX$_2$ and dX$_3$ respectively. Similarly, fingerprints dY$_0$, dY$_1$ and dY$_2$ are created for documents Y$_0$, Y$_1$ and Y$_2$ of FIG. 2b. The term 'fingerprint' is intended to be synonymous with CRC, and sometimes it is used herein to refer to the combined CRC's of both the body text and the normalized subject, since it is this combination that is preferably used for comparison. This combination, of CRC for the body text with CRC for the normalized subject, is also known as the "determiner" for the document.

Having described the compilation of fingerprints for the documents, the process of normalization of text is described.

In one embodiment, before creation of the fingerprint, normalization is applied to the body text and/or subject parameter. The fingerprint would then be compiled from the normalized text. Normalization includes a 1:1 ratio, in which the normalization output is equivalent to the input, and such normalization is ineffective. In this case, the text may be referred to as normalized text, even if no normalization function has been applied to it. However, normalization can also remove features that are not directly part of the body text or subject. For example, for most documents, normalization can be applied to strip all formatting. This includes font, font size, italics, bold, color, etc. For email documents, normalization may also include removing characters that were added by the software document creation program. An example of added characters is the ">" sign typically added by email programs when a user replies to an email. The ">" sign at the beginning of a line indicates that that line of text is copied from the email to which the user is replying. Normalization can also remove headers, footers, attachments and attachment notices, disclaimers, and signatures. Another example of added characters is in the subject parameter of headers. When replying to emails, email programs typically add to the subject line the characters "Re:", and when forwarding, they add the characters "Fw:" or "Fwd:". Other characters that are sometimes added to the body text, by email programs include "=20", added when incorrectly converting from certain email programs to others. Sometimes a vertical line is added on the left to indicate included text from a previous email. Superfluous spaces are sometimes added, tabs, new line, etc. For the purpose of comparison between documents, normalization is applied to the body text and/or subject parameter. However, the original body text and subject parameter text is also preserved.

According to certain embodiments, the presence of signatures, disclaimers, anti-virus lines, free mail program notification (program added text), and attachment notification, can result in the lack of detection of true duplicates. For example, two emails may seem different only because they contain different disclaimers. Alternatively, two emails may seem to be near-duplicates, when really they are very different, but they contain the same long disclaimer. It has been described above that these parameters may be removed in the normalization process. According to certain embodiments, a further category of normalization is described here. Disclaimers and the like are stripped from the document, and are replaced with a single word or number, unique to each type of disclaimer, signature, etc. This action reduces the influence of a long disclaimer on the rest of the text. Thus two emails whose main texts are not near duplicates will not suddenly appear as near-duplicates due to having identical disclaimers. Yet also two emails that have identical texts with different disclaimers, are related but are not true duplicates, so the presence of the replacement word ensures that the text analysis categorizes them as near-duplicates. According to one embodiment of a method for applying the invention, the method includes removing each of disclaimers, signatures, program added text and attachment notifications from the body text of documents, and replacing each unique disclaimer, signature, program added text and attachment notification with a unique short identifier prior to the creation of the document fingerprint.

In accordance with certain embodiments, there is provided a sequence of operations using normalized fingerprints, to determine equivalence and inclusiveness of documents. The embodiment should not be construed as limiting the invention in any way, as a number of alternative embodiments also exist. For example, other means can be implemented to assign values, or the entire system may use Object Oriented Programming instead of a data structure or database, etc. Data structure details can be organized differently, and may be organized in terms of trees instead of in terms of documents, as described herein. A non-limiting form of data structure is an SQL database, however, the invention does not need to use a data structure in any way. Hence, the following embodiment should not be construed as limiting, but is provided for exemplary purposes only.

Equivalence and inclusiveness may be alternatively accomplished by an individual algorithm, or another method may be used entirely to achieve the intent of the present invention. In one example, all documents can be first expanded into all of their component presumed documents, before comparison. Or, in another example, only the most inclusive documents are identified. Or, in a further example, selected documents from amongst a large group are processed. These selected documents may refer to all of the documents, or a defined subgroup from amongst the documents. Yet the following is a suggested embodiment. It is assumed that the document presented for processing has not yet been searched for header-type text, nor has any normalization yet been applied, nor have fingerprints been created.

The following is a specific example that serves to illustrate a broader concept. The specific example involves certain details that only represent one embodiment of the present invention, and is provided for exemplary purposes only. In accordance with certain embodiments of the invention, a processor is used with associated display, for communicating with the data structure. The processor is capable of manipulating the data of the data structure and displaying selected data on a display unit. With reference to FIG. 3, a document is presented for processing. In the present example, the document involved is an e-mail.

In step 301, the document is assigned a DocID value, and an index of zero. For example, the document may be assigned a DocID of 100.

In step 302, a field is set up for the document being processed, entitled MailID. This is initialized as the DocID of the document.

In step 303, the three identifiers described for the document are stored in a data structure, for example, for a first document, the particulars might be as follows:

| DocID | MailID | Index |
|---|---|---|
| 100 | 100 | 0 |

In preliminary step 304a, fields from the e-mail metadata are considered header fields. These include, but are not limited to the following fields: To, CC, BCC, Sent time, Internet Message ID, In Reply Message ID, Subject.

According to certain embodiments, in step 304b, the abovementioned fields from the e-mail header are parsed, including the fields: From, To, CC, BCC, Sent time, Internet Message ID, In Reply Message ID, Subject, Body, attachments. The parsed information is stored in a data structure.

In step 305, the Subject parameter is normalized and a CRC—MD5 is computed on the normalized subject (Nsubject). Both the subject and the CRC of the normalized subject are stored.

In step 306, a CRC on the normalized body text (Nbody) is calculated.

In step 307, the normalized body CRC and normalized subject CRC are compared with others in a repository for CRCs, and if a matching CRC pair already exists in the repository, the DocID of this document is linked to that of the match, and the document is finished being processed.

Otherwise, step 308, a loop, is accessed. This loop enables multiple presumed e-mails, from the body text of the original email, to be located, indexed, and processed. In step 308a, the body text of the original email is searched to locate the next presumed email. In step 308b, if a presumed email is found, the presumed email is provided with identification, and its index is set to one greater than that of the previously processed presumed email. In step 308c, one is directed to follow again all the steps to process repeatedly the remainder of the body of the email for successive instances of header-type text, as stipulated in steps 303 onwards; for each instance, to construct a presumed document, index it, create a CRC pair, compare it for matching documents, and link if found. In step 308d, when no more presumed emails can be located within the body text of the original email, the document is finished being processed.

The following table shows the index value that has been assigned to each of three presumed documents that are derived from the original document with DocID of 100.

| DocID | MailID | Index |
| --- | --- | --- |
| 100 | 100 | 0 |
| 110 | 100 | 1 |
| 120 | 100 | 2 |
| 130 | 100 | 3 |

Note that each document can be derived from the document of next lowest index value. For example, document 110 can be derived from 100 (as indeed it was), and document 120 from 110. Therefore document 100 is inclusive of document 110, and document 110 is inclusive of document 120. Each document is inclusive of the document of the next index value. Additionally, document 100 is inclusive of all documents that are equivalent to document 110. Inclusiveness of documents and equivalent documents is described with reference to FIG. 5.

The following representation details the comparison of documents for equivalence, and also details the construction and comparison of presumed documents, the latter being similar to the above description with reference to FIG. 3. This representation is again a narrow description of a broader concept, and is provided for exemplary purposes only.

Figure 4A:
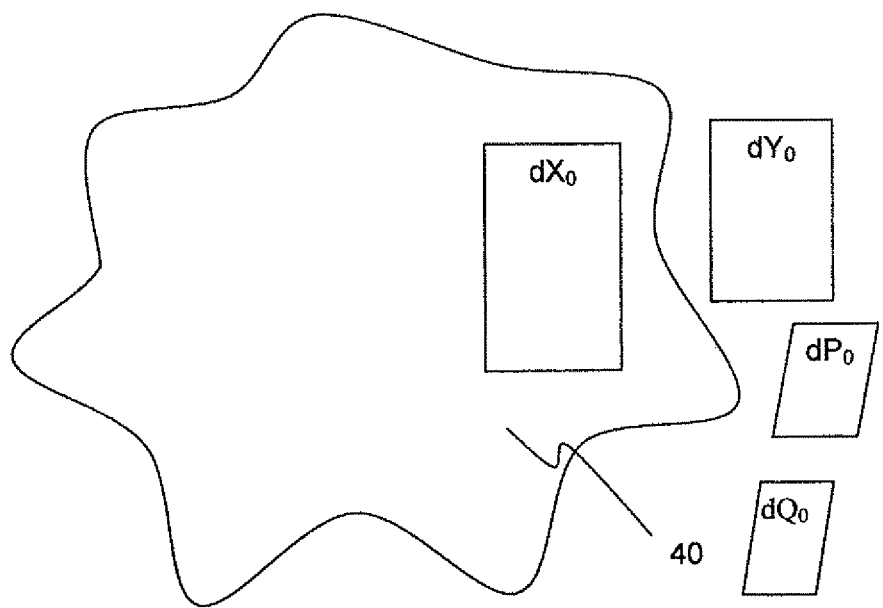
FIGS. 4a-4e illustrate the comparison and storage of fingerprints, in accordance with an embodiment of the invention.

In the following representation, a number of documents are to be compared with one another for equivalence. The documents involved are original documents $X_0$ and $Y_0$ from FIGS. 2a and 2b, as well as an additional two documents $P_0$ and $Q_0$. Fingerprints have been created for each of the documents, namely $dX_0$, $dY_0$, $dP_0$ and $dQ_0$ respectively. None of the documents have yet been reconstructed to find presumed documents within them. With reference now to FIG. 4a, repository 40 is shown. As can be seen, a number of fingerprints are waiting to be processed. Fingerprint $dX_0$ is the first of the four fingerprints to be processed. It is inserted into repository 40 for comparison, and, since no equivalent fingerprints are found, fingerprint $dX_0$ is then stored in repository 40.

Figure 4B:
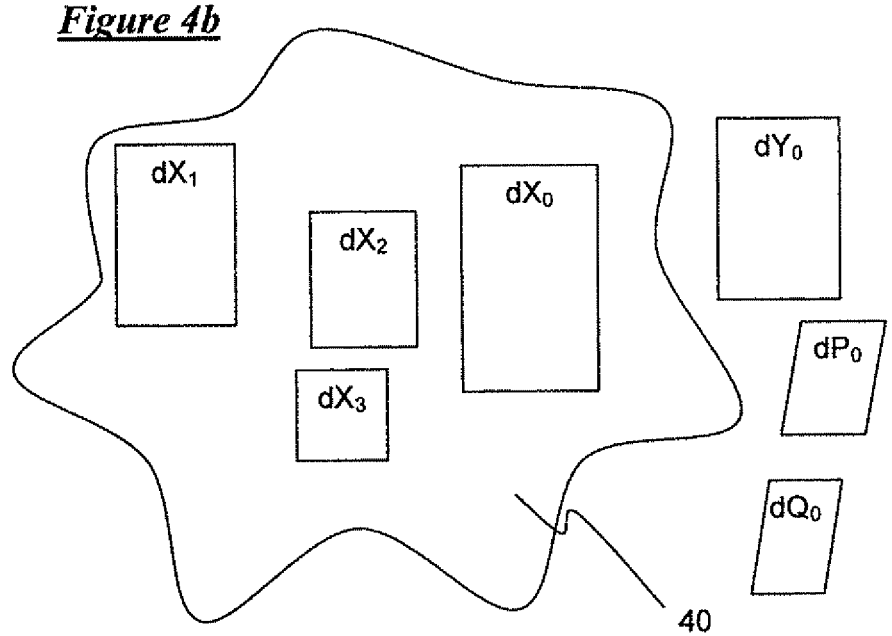

With reference now to FIG. 4b, the text of document $X_0$ is then searched for presumed documents, and presumed document $X_1$ is found. Fingerprint $dX_1$ is created for presumed document $X_1$. Fingerprint $dX_1$ is then inserted for comparison into repository 40. Fingerprint $dX_1$ is also found to have no equivalents and so it is also stored in repository 40, Document $X_0$ is then searched again, for further presumed documents, and document $X_2$ is found, for which fingerprint $dX_2$ is created. Fingerprint $dX_2$ is inserted for comparison into repository 40. Fingerprint $dX_2$ is also found to have no equivalents and so it is also stored in repository 40. Document $X_0$ is then searched for further presumed documents, and document $X_3$ is found, for which fingerprint $dX_3$ is created. Fingerprint $dX_3$ is inserted for comparison into repository 40. Fingerprint $dX_3$ is also found to have no equivalents and so it is also stored in repository 40. Document $X_0$ is then searched for further presumed documents and no more are found.

Figure 4C:
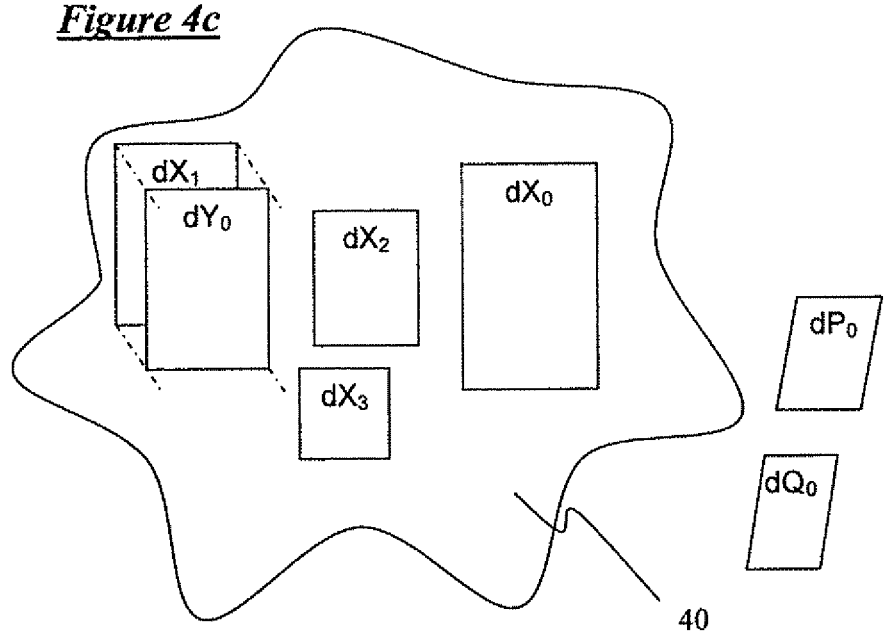

With reference to FIG. 4c, fingerprint $dY_0$ is now processed. Fingerprint $dY_0$ is inserted into repository 40, and compared with all the previously stored fingerprints. It is found to be identical to fingerprint $dX_1$. As a result of this, fingerprint $dY_0$ is not stored, but fingerprint $dX_1$ is registered as being a fingerprint of $dY_0$ as well as of $dX_1$. It is noteworthy that it is not necessary to search document $Y_0$ to find the presumed emails $Y_1$ and $Y_2$ that it does in fact include, as shown in FIG. 2b, since document $Y_0$ has already been found to be equivalent to document $X_1$, which has already been expanded.

Figure 4D:
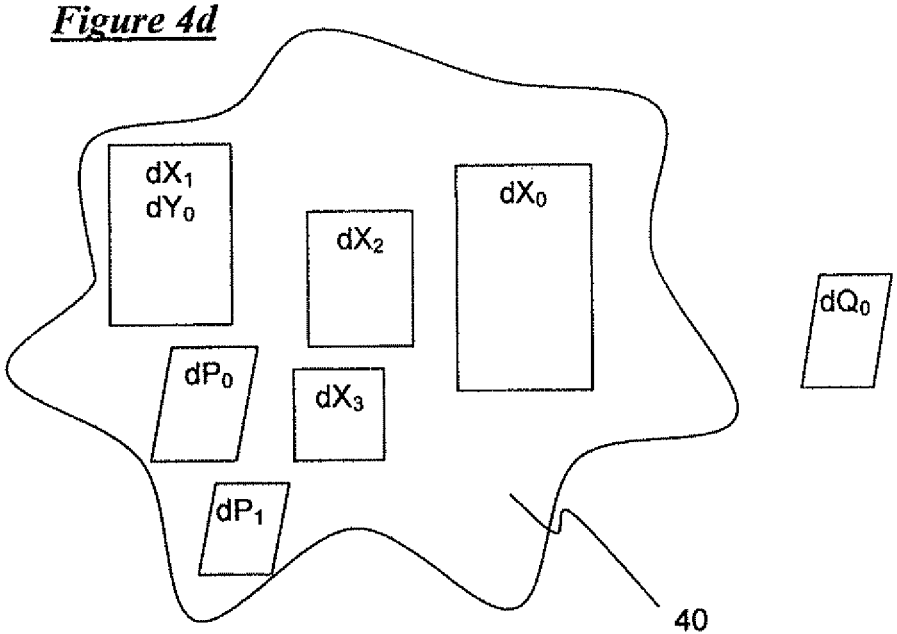

With reference to FIG. 4d, fingerprint $dP_0$ is processed. It is found to have no equivalents, so it is stored in repository 40. Document $P_0$ is then searched and found to include document $P_1$, for which a fingerprint $dP_1$ is created. Fingerprint $dP_1$ is also inserted into repository 40, found to have no equivalents, and stored. Document $P_0$ is searched for further expansion possibilities and none are discovered.

Figure 4E:
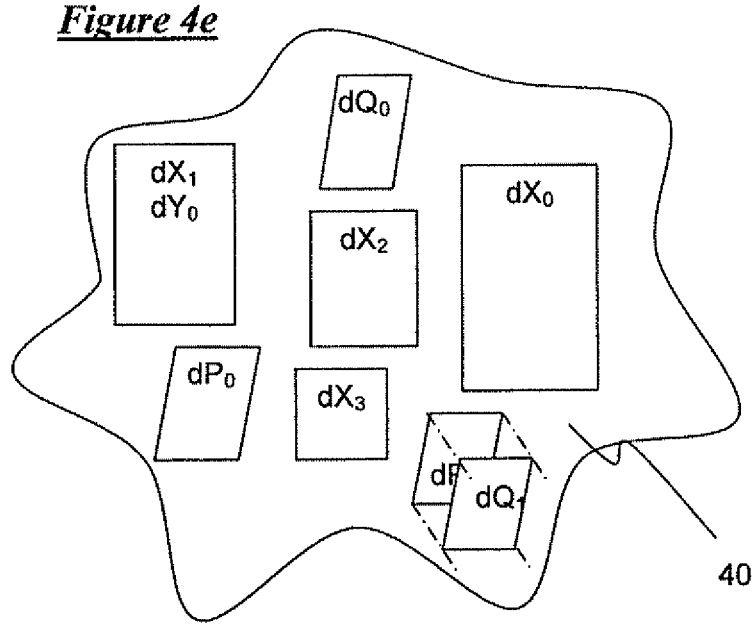

With reference to FIG. 4e, fingerprint $dQ_0$ is inserted into repository 40, and found to have no equivalents, so it is stored in repository 40. Document $Q_0$ is then searched and found to include document $Q_1$, for which a fingerprint $dQ_1$ is created. Fingerprint $dQ_1$ is also inserted into repository 40, and found to be equivalent to $dP_1$. Fingerprint $dQ_1$ is therefore not stored, but fingerprint $dX_1$ is registered as being a fingerprint of $dY_0$ as well as of $dQ_1$.

With reference to FIG. 5, a suggested sequence of operations is provided for building nodes and trees from compared documents. The compared documents may have been compared by any of a variety of methods, for example, as described with reference to the representation of FIG. 4.

Figure 5B:
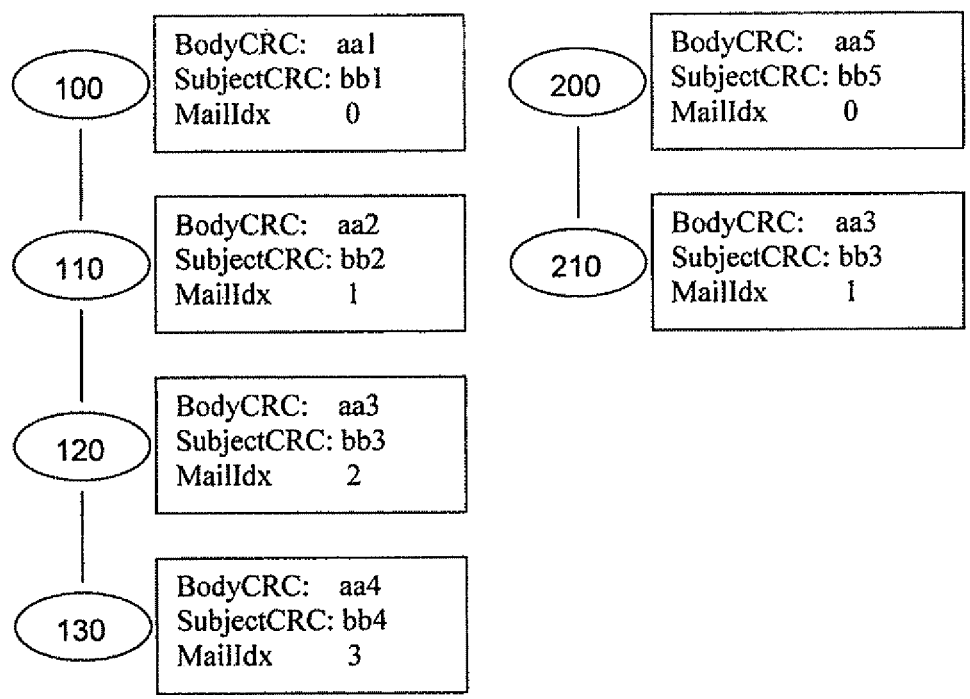
Figure 5C:
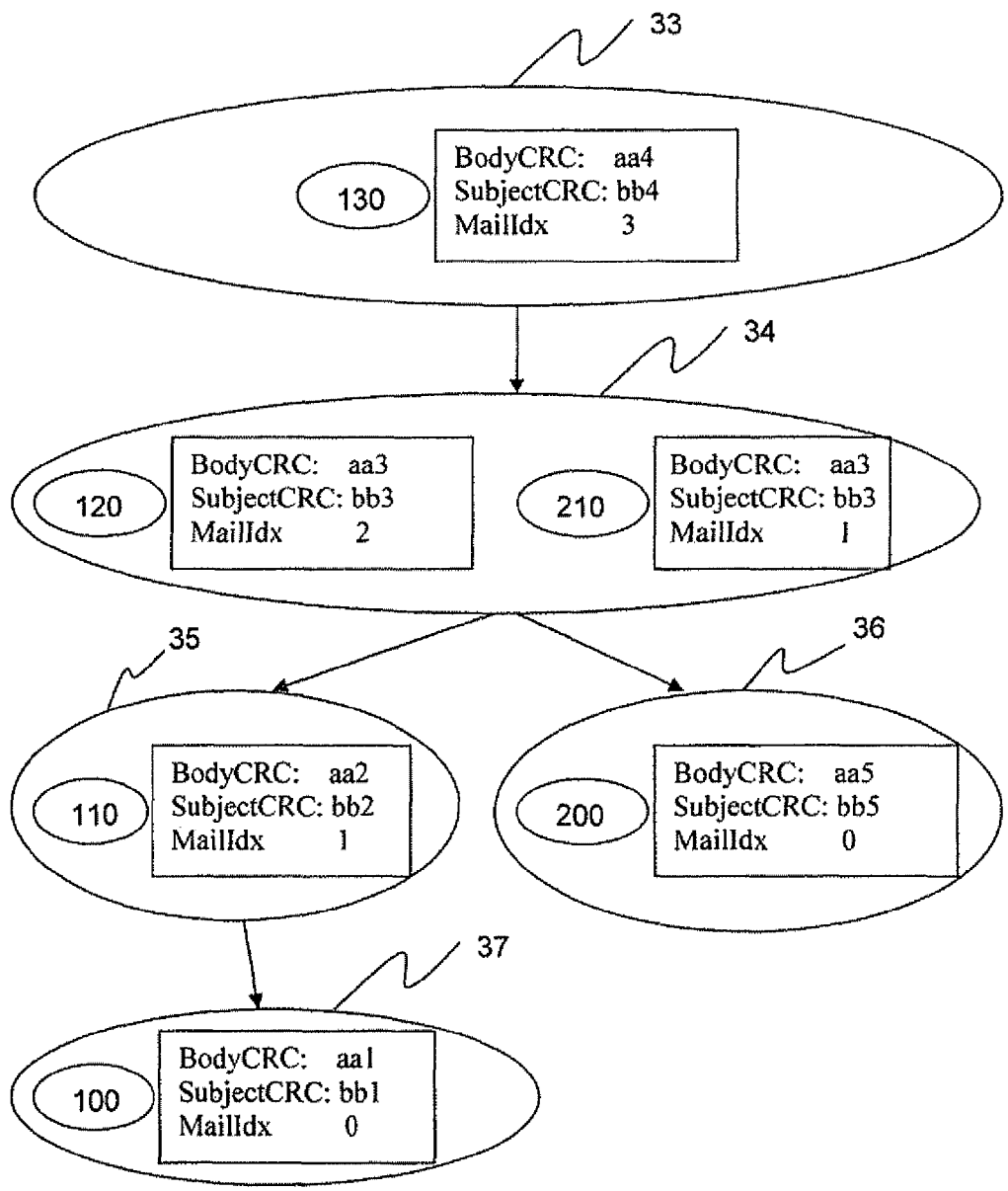

The following sequence of operations is presented in FIG. 5a, and an example set of documents is shown in FIG. 5b, relating to the sequence of operations. FIG. 5c shows the documents of FIG. 5b arranged into a tree after implementing the sequence of operations of FIG. 5a. With reference now to FIG. 5b, two original documents are shown, namely 100 and 200. Each is expanded to produce presumed documents—document 100 is expanded to produce documents having DocID of 110, 120 and 130 respectively, while document 200 is expanded to produce document 210. These document numbers can also be referred to as the document identifiers, or DocID. A MailID of the original and all the derived presumed documents is set as the DocID of the original document from which they were derived. Thus, for example, the MailID of documents with DocID of 100, 110, 120 and 130, are all 100, as is actually shown in the table above, with reference to step 308 of FIG. 3.

With reference once again to FIG. 5b, each document is displayed as having a normalized body text CRC and a normalized subject CRC. For example, for document 100, these are 'aa1' and 'bb1' respectively. Each document is assigned a document index according to its relationship with the original document from which it is derived. For example, Document 100 has an index of 0, indicating it is an original document, 101 has an index of 1, etc, as it is the first presumed document located within the body text of document 100, etc. It will be noted that Document 210 has the identical normalized body text CRC and normalized subject CRC to document 120, namely 'aa3' and 'bb3', although they are derived from different original documents. That is why, in FIG. 5c, these two documents are associated with the same node of the same tree.

With reference now to FIG. 5a, in step 501, a field is created in the data structure for each document, entitled NodeID. NodeID represents the node to which the document is to be mapped in the tree, although it does not refer to any specific node in any specific tree. Rather, NodeID represents a value that is the same for all documents that are supposed to be mapped to the same node. According to certain embodiments, all documents that have the same normalized body text CRC and normalized subject CRC should be affiliated with, or associated with, the same node, so they are to be updated to the same NodeID. The NodeID field (for each document) is initially copied from the DocID field of the document. When a document is identified as having the same normalized body text CRC and normalized subject CRC as a prior document, the two nodes are merged, as follows. The NodeID field for one of the documents is updated to the lower value NodeID between the two documents. Updating to the lower value ensures that as documents are added, the NodeID of already updated documents remained constant. Various documents may end up with the same NodeID. For example, document 210 has the same fingerprint as document 120. Document 120 has the lower DocID (since it was processed before Document 210), so the NodeID of document 210 would update to the NodeID of 120, which is a copy of the DocID of document 120. The following table indicates the DocID and the NodeID of the example documents:

| DocID | NodeID |
|-------|--------|
| 100   | 100    |
| 110   | 110    |
| 120   | 120    |
| 130   | 130    |
| 200   | 200    |
| 210   | 120    |

When a first presumed document is found within an original document, the first presumed document becomes the parent of the original document, because it is assumed to have happened before original document. When a second presumed document is found, it is assigned to be the parent of the first presumed document, since the second presumed document is more embedded than the first presumed document, and it is therefore assumed to have occurred earlier. The node associated with each sequentially derived presumed document (derived from the same document) becomes a parent of the node associated with the previously derived presumed document.

The root of a tree is associated with a node that has no parents. A document with no parent is an original or presumed document that does not include within its text any further presumed documents. In step 502, a field is filled in (for each document), in the data structure, entitled ParentNode. This ParentNodeID indicates which other document is the adjacent node in the root direction on a tree. The root of the tree is the node associated with least inclusive document of the tree—the document presumed to have been the earliest. Initially, ParentNodeID is set for all documents at −1, indicating that the document should be associated with a node having no parents. However, when a parent node is identified for a document, the field of ParentNodeID is updated with the NodeID of the parent node. In the example, the ParentNodeID field for Document 130 is identified as −1. All the other documents take their ParentNodeID according to the document index as reflected in their NodeID. The following table shows the ParentNodeID for each of the example documents:

| DocID | Parent Node |
|-------|-------------|
| 100   | 110         |
| 110   | 120         |
| 120   | 130         |
| 130   | −1          |
| 200   | 120         |
| 210   | 130         |

In step 503, a field is filled in (for each document), entitled TreeID. This field identifies all documents that should belong to the same tree with the same value. Initially, TreeID for all documents is set as a copy of the NodeID field of the document. Beginning with a document that has a value for ParentNodeID of −1, the TreeID for that document remains as the NodeID. Descendants, or children, of that parent node, as indicated by their ParentNodeID field, then have their TreeID updated to that of their parent node. Then, the next generations of children have their TreeID updated to that of their parent node. In this way, all documents belonging to the same tree have the same node. The following table shows the TreeID for each of the example documents:

| DocID | TreeID |
|-------|--------|
| 100   | 130    |
| 110   | 130    |
| 120   | 130    |
| 130   | 130    |
| 200   | 130    |
| 210   | 130    |

In step 504, a field can be filled in (for all documents) entitled UNION EQUISET. This field relates to linking trees that are identified as belonging to document sets, to be displayed together, as will be described with reference to FIG. 7. Document sets are two or more trees that one chooses to have linked together. For example one may want to link documents that are near duplicates of one another (a method of determining near duplicate data objects is described below with reference to FIGS. 10-14), or documents that appear to be connected due to the sameness of their Conversation Index (Microsoft Outlook), or In Reply Message ID (Some Unix mail systems).

It is also possible to merge trees that are indicated as similar by the field of UNION EQUISET. In a practical example, if a reviewer wishes to view two documents that are near duplicates of one another, together he may be able to merge the two trees that they are each part of. The two nodes may be placed adjacent to one another, with or without hyperlinks, and the rest of the trees to which they each belong are similarly put adjacent to or merged with each other, as part of the same tree.

In step 505, for documents that have the same TreeID, the lowest value of NodeID is used as an update value for the TreeID. As mentioned before, using the lower value for the update ensures that earlier documents do not get updated, and remain with their assigned values. The following table shows the updated TreeID for each of the example documents:

| DocID | TreeID |
|-------|--------|
| 100   | 100    |
| 110   | 100    |
| 120   | 100    |
| 130   | 100    |
| 200   | 100    |
| 210   | 100    |

As can be seen from the above table, all the documents have a TreeID of 100, and therefore are in the same tree. FIG. 5c shows the documents arranged in a tree. Each document is associated with, or represented by, a different node, except for 120 and 210, that share a node. The order of the nodes within the tree follows the fields for ParentNodeID of step 502. Root node 33, contains 130, first intermediate node 34 contains 120 and 210, from which branches second intermediate node 35 containing 110, and first leaf node 36 containing 200. Second leaf node 37, containing 100, branches from second intermediate node 35.

Email messages often contain peripheries, such as disclaimers, signatures, and attachments. In one embodiment of the present invention, these are suppressed prior to creating a fingerprint and comparing fingerprints. However, in another embodiment, they may be included in the CRC, or a CRC for these may be used as well. In addition, even if not used for purposes of document creation, these peripheries may be affiliated with the node containing the document to which they pertain, for a reviewer to access.

Emails having the same normalized subject and the same normalized body text may contain different attachments. For example, a single user can send an email with the same subject and body text to two different recipients, while each of the two emails contain a different attachment (or only one of the emails contains an attachment). According to certain embodiments, in addition to the subject and body text, the attachment of the email is also used for comparison between emails. Emails may be considered identical if the subject, the body text and the attachments in the emails are identical. In other embodiments the body text and the attachments are used for comparison between emails, wherein the subject is disregarded. According to certain embodiments, a CRC on email attachments is calculated and a fingerprint of the attachment is created for the purpose of comparison between the attachments in the different emails. According to other embodiments, wherein an email contains more than one attachment, a CRC is calculated for each of the attachments and the resulting CRCs are summed. Thus, if two emails contain the same attachments, albeit in different order, the sum of CRCs will be equivalent.

Figure 5D:
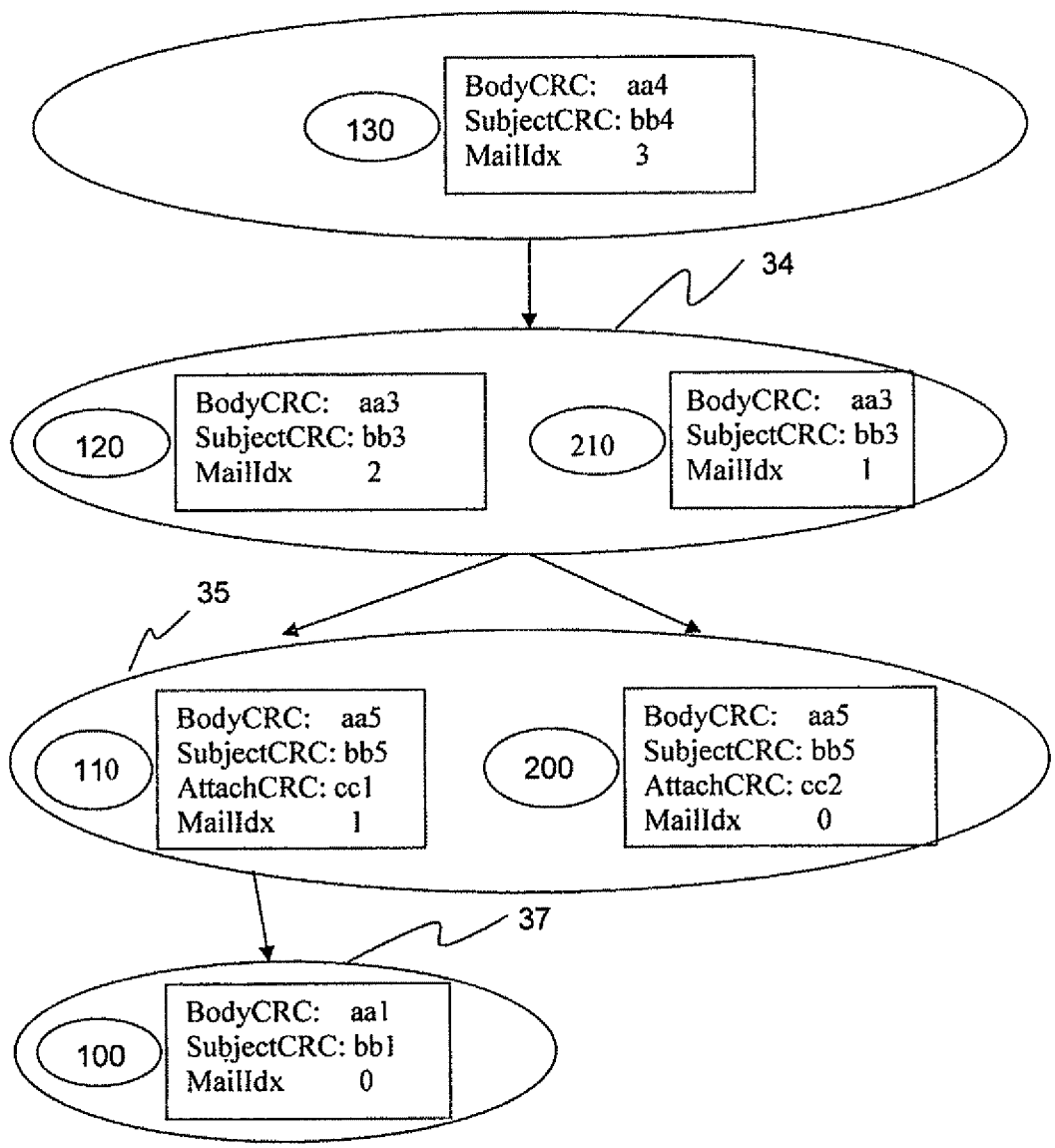
FIGS. 5d-5e illustrates an example of a tree created while taking into consideration email attachments, in accordance with an embodiment of the invention.
Figure 5E:
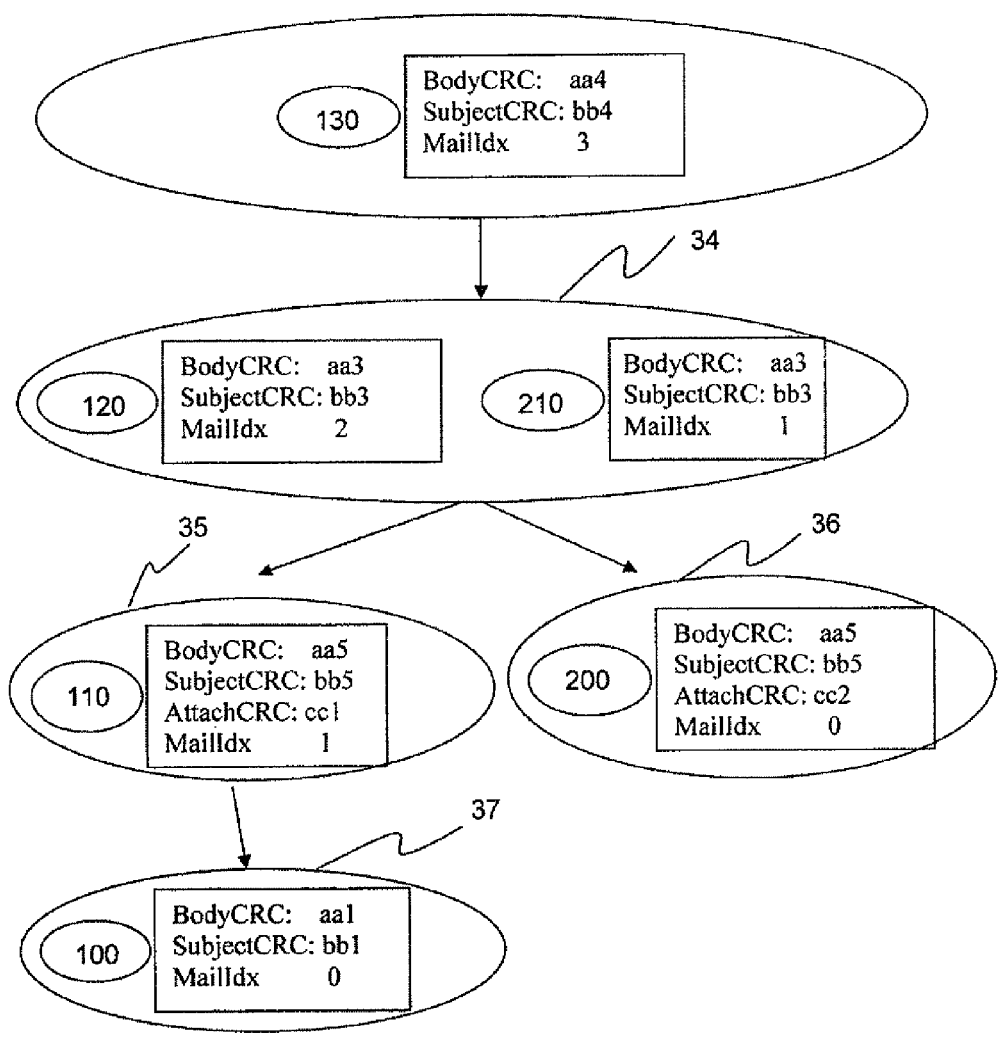

FIGS. 5d-5e show the process of arranging the documents in a tree, wherein emails are considered matching only if the normalized email attachments are the same. According to certain embodiments, the building of the tree depicted in FIG. 5e is divided into two stages. The first stage, which is shown in FIG. 5d, follows the same stages which were described with reference to FIG. 5c above. Node 35, in FIG. 5d, contains both 110 and 200 as the body CRC and the subject CRC of the two are the same. In the second stage the email attachments, which were positioned in the same node during the first stage, are compared. As shown in FIG. 5e emails having different attachments (in node 35) are separated into different nodes (nodes 35 and 36). According to certain embodiments, an arbitrary decision is made to which of the separated nodes, the decedents of the previously united node (i.e. node 35 in FIG. 5d) are to be connected.

A method of determining near-duplicate data objects is described below with reference to FIGS. 10-14. According to certain embodiments, instead of single data objects, groups of data objects can be compared in order to determine whether the different groups of data objects are near duplicates. According to certain embodiments, data objects within each group may be of a distinct type, and determining near duplication between different groups of objects is done by determining near duplication between data objects of the same type. For example an email message may contain a body text and at least one attachment, the body text and each attachment representing a separate data object (the body text and the attachments representing different types of data objects). According to certain embodiments, the method of determining near-duplicate data objects is implemented on the body text of the different emails (i.e. comparing between body text of different emails) and on the attachment of the different emails (i.e. comparing between attachments associated with different emails). If the result of the above calculation indicates that both the body text and the attachments qualify as near-duplicates according to the predefined resemblance criteria, the emails are defined as near duplicates. It should be noted that according to certain embodiments, the email may by determined as a near-duplicate if the body text of the different emails is identical, while the attachments of the different email are near-duplicates, or vise versa. In one non-limiting example, as specified in detail below, Border measure can be facilitated for determining the percentage of the identity between the body text of the compared emails and between the documents attached to the compared emails (both of which being candidates for near duplicated documents as specified below). If the Border measure for both body text and attached documents is above the required threshold, the emails are determined as near duplicates.

The following description relates to certain embodiments of the present invention, in which there is provided a method to arrange the aforementioned documents and presumed documents into groups according to their degree of inclusiveness, and according to their equivalence with other documents. Generally speaking, the groups are in the form of trees, as will now be described with reference to FIG. 6. However, the aforementioned documents can alternatively be arranged in the form of columns or lists, or simply individual documents can be selected for perusal, as will be described with reference to FIGS. 8d and 8e.

Figure 6A:
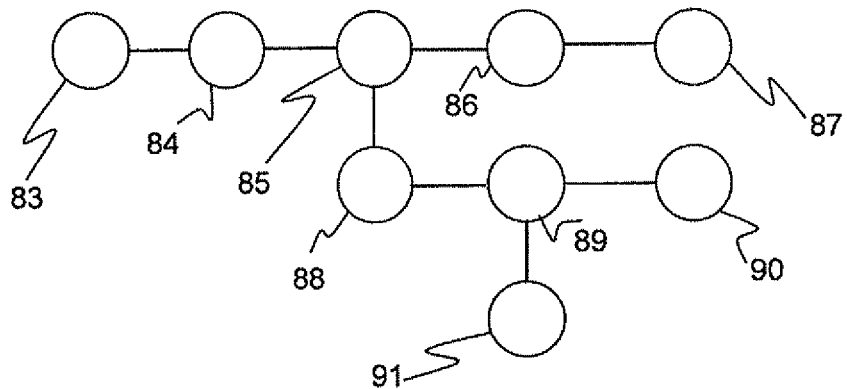
FIGS. 6a-6c illustrate sample displays showing documents organized according to trees.

With reference to FIG. 6a, the output of the data structure is presented as a representational tree consisting of connected nodes. The tree may be a part of the data structure or communicated from the data structure to another unit, etc. Root node 83 is associated with a document that has body text that is not inclusive of the body text of any other document. Each intermediate node 84 is associated with a document that has body text that includes all the body text of the previous node, from the root direction. Leaf node 85 is associated with an inclusive document, having body text that includes all the body text from the string of nodes between root node 83 and leaf node 85.

By way of example, if the documents of FIG. 1 were arranged in a tree, FIG. 1a would be associated with a root node 83, FIG. 1b with an intermediate node 34, and FIG. 1e, with a leaf node 85. However, it is to be noted, that a tree may consist of only a single node, if the document associated with the single node has no included documents. In this case, the single node is both the root node and the leaf node.

As shown in FIG. 6a, there may be several branches to the tree. In FIG. 6a, the following three sets of nodes each represent a branch: Nodes 83, 84, 85, 86, 87, Nodes 83, 84, 85, 88, 89, 90, and Nodes 83, 84, 85, 88, 89, 91. Each of the three branches begins with root node 83, and each culminates in a leaf node 87, 90, 91. Such branching occurs when several different documents are all inclusive of a common body text. In the current example, all the three branches include root node 83 and nodes 84 and 85. The documents that are associated with these nodes have body text that is shared by all of the more inclusive nodes 86-91. A node that features immediately adjacent to an arbitrary first node, in the root direction thereof, is termed the parent node of the first node.

The tree is designed to organize the documents into linked nodes. Each node is associated with a group of documents that are equivalent, or at least substantially so (for example, they may have characters that are removed in the normalization of the subject procedure). Links between nodes imply that the text of a document associated with a node on the leaf side of the link includes the text of a document associated with a node on the root side of the link. For example, the text of the document associated with node 86 includes the text of the document associated with node 85.

According to certain embodiments of the present invention, the data structure is arranged in the form of trees, and a tree is defined as a set of directionally interlinked nodes. Each node is associated with at least one document, and all documents associated with a given node have substantially the same body text. Also, all documents having substantially the same body text are associated with the same node. The directional interlinkage indicates that if a first node is a descendent of a second node, the body text of each document associated with the first node is substantially inclusive of the body text of each document that is associated with the second node. For example, node 86 is a descendant of node 85, and the document associated with node 86 is substantially inclusive of the body text of any and all documents that are associated with node 85. The second node is a parent node of the first node. In the example just given, node 85 is termed the parent node of node 86.

The root node of a tree (83) is the ultimate parent of the tree, having no parents itself. In different trees, the root node may have one or more descendant nodes, (descendants include intermediate and root nodes) or a root may have no descendants. In FIG. 6a, root node 83 has 8 descendent nodes (84-91). There may be several generations of descendant nodes, for example both an intermediate node and a leaf node together provide two generations of descendants. In FIG. 6a, there are 5 generations of descendant nodes (1st generation: 84, 2nd generation: 85, 3rd generation: 86 and 88, the 4th generation: 87 and 89, and 5th generation: 90 and 91). Also, there may be several same generation nodes, for example there may be two parallel branches of nodes branching off a parent node. In FIG. 6a there are several sets of same generation nodes, for example the 3rd generation has two same generation nodes: 86 and 88, the 4th generation also has 2 same generation nodes: 87 and 89 and the 5th generation has 90 and 91.

Figure 6B:
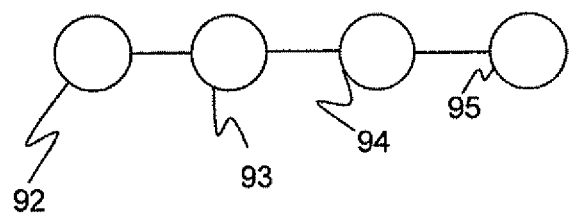

With reference now to FIG. 6b, the documents whose fingerprints are in repository 40 of FIG. 4e, are organized and presented according to trees. Presumed documents are arranged relative to the original document from which they are derived, by being placed in the root direction of more inclusive documents. When two documents share a common root, it is implied that they both contain the body text of the root. Hence, any presumed document will automatically be placed in the root direction of the document from which it is derived.

In one embodiment, presumed documents are 'put into' or associated with the same tree as the original document from which they are derived, the root node is the smallest presumed document, that is, the last one to be derived from the original document. The other presumed documents are arranged in the root direction (ie, towards the root) according to their degree of inclusiveness. As a result, a node is associated with a document that has all the body text of all the other nodes in the direction of the root. In addition, documents that are equivalent, that is, they have the same body text and subject line, as determined by the document fingerprints, share a node. In this way, more complex trees can be created than simply by stringing together trees according to their original composition within a document. It is to be noted that in another embodiment, presumed documents are not associated with nodes, they are only used in order to determine the nodes that other documents, that are equivalent to the presumed documents, should be associated with. However, in a further embodiment, also presumed documents are associated with nodes, sometimes forming a 'missing link' when no original email is equivalent to them.

In the present example shown in FIG. 6b, there is only one tree, containing four nodes 92-95.

In one embodiment, root node 92 links to, (also termed: "is affiliated with" or otherwise displays) the body text and subject line (non-normalized) of document $X_3$. Root node 92 is also affiliated with certain header parameters of document $X_3$, taken from the header or metadata of the document, and arranged in a table for easy perusal. First intermediate node 93 (adjacent root node 92) contains the body text and subject line of document $X_2$, and is affiliated with header parameters from document $X_2$. Second intermediate node 94 contains the body text and subject line of document $Y_0$, and is affiliated with header parameters of both documents $Y_0$ and $X_1$. Leaf node 95 contains the body text and subject parameter of document $X_0$ and is affiliated with header parameters of document $X_0$. The header parameters may be affiliated by means of hyperlinks to the original document, or the header parameters may be copied into a hyperlinked or otherwise affiliated table.

It will be noted that only two of the nodes are associated with original documents, that is, second intermediate node 94, associated with document $Y_0$, and leaf node 95, associated with document $X_0$. The fact that a single tree includes nodes associated with two different original documents, namely $Y_0$ and $X_0$, indicates to a reviewer that the contents of the two documents $X_0$ and $Y_0$ are related. Since they occur along the same thread within the tree, the reviewer can see that document $X_0$ contains all of the text of document $Y_0$ as well as some additional matter.

Figure 6C:
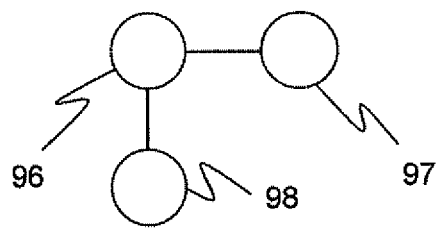

With reference now to FIG. 6c, a third tree is shown, displaying nodes for the remaining documents whose fingerprints feature in repository 40 of FIG. 4e. The tree consists of just three nodes, that is, one root node 96 and two leaf nodes 97 and 98. Each leaf node (97 and 98) contains the body text and subject parameter of an original document, namely $P_0$ and $Q_0$. Root node 96 contains the body text and subject parameter of presumed document $P_1$, and also supplies affiliations to header parameters of both documents $P_1$ and $Q_1$. Thus two original documents are associated with nodes that are connected into a single tree by virtue of their common included presumed document. This single tree indicates to a viewer that the contents of the two documents $P_0$ and $Q_0$ includes identical body text, and that they are likely to be related to a similar subject matter. Thus such a tree increases a viewer's comprehension, compared with viewing the documents as isolated events.

In accordance with certain embodiments of the present invention, additional features of a tree and its construction relate to the fact that emails can be linked into a tree even if they have different subject parameters from one another. The factors that determine if nodes are joined to form a tree include descent, and equivalence of the associated document. It is possible for a user to have changed the subject line of an email in the course of a correspondence. However, if a more inclusive email exists, this can be expanded into a selection of presumed emails, in which the earlier dated ones will have the first subject line, and the later dated ones will have the second subject line. The presence of the more inclusive email indicates that although the subject line has changed, the documents are nevertheless part of a single conversational thread. The more inclusive email is expanded into a set of presumed documents that remain indexed together. As a result, the presumed documents—and all the documents that duplicate to them, are joined into the same tree. Thus, although the subject line of some of these documents is one thing, and the subject line of other of these documents is another, they are nevertheless presented on the same tree, as they were part of the same thread, as indicated by the more inclusive document's expanded contents.

Another benefit of an embodiment of the tree presentation of documents is that a reviewer probably does not wish to read through duplicated documents twice. He can read just one copy or just the subject and body text of a document associated with the node, in response to clicking on a node, if the node is represented on a display as a clickable icon. Or if the node is not a clickable icon, it may give other written directions or a different form of affiliation to the document text. In addition, the reviewer may still have access via the node to a hyperlink to metadata of all the original equivalent documents. If the node is associated with only a presumed document, the node can affiliate to metadata from the presumed documents too (or the node may simply be suppressed from view, as preferred).

In accordance with certain embodiments of the present invention, header parameters of equivalent documents grouped into a table and accessed from the associated node make it particularly easy for a reviewer to compare header parameters and/or statistics between the different copies of ostensibly the same document. For example, he may see which copy is recorded as having been sent first, find out if there are date discrepancies (perhaps one copy of the same email was sent on different days to different people), and find out who recipients of documents are, and more. All this information is available and can even be presented as a list or a table for easy comparison between parameters. Yet in some instances, this information is not required. Therefore, in a further embodiment of the present invention, all metadata is hidden from casual view and presented only upon clicking on an icon or similar reference.

In some cases, a reviewer wishes to have access to all body texts and subject lines, but does not wish to spend time reading anything twice. For example, if the contents of one document are all included within a second document, the reviewer may prefer to be able to read only the inclusive document. Certain embodiments of the present invention provide that documents are organized and presented according to trees, as described above, enabling the reviewer to selectively read only the leaf node, and he will be assured that he has accessed all the content for the documents associated with all nodes leading to that leaf. Additionally, a processor may be configured to indicate on a display unit which nodes are the leaf nodes. For example, leaf nodes may be marked or highlighted, so that the reviewer should know which to read. Additionally, in response to a user command, the processor can be configured to mark nodes for the display unit, in order to indicate whether a thread has been read, the relevance or priority of the thread, or the level of importance of the thread. The processor may further be configured to allow reviewer comments to be added to the display unit.

An additional embodiment of the present invention includes a 'Leaf Compare' tool—that is, a text comparison tool that compares between the text of the emails associated with two different nodes, for example between two leaves of the same tree. Using the leaf compare tool, a reviewer can access just the differences between two leaves, without having to re-read the content common to both leaves. The text compare tool may be similar to standard document compare tools, or application specific. It preferably enables three different text formats, indicating deleted text (that is, text from a first node that does not appear in a second node), added text (that is, text from a second node that does not appear in a first node), and common text (that is, common text to both nodes), between two (or more) leaves. Examples of different text formats include but are not limited to, red strikeout text for deleted text, blue underlined text for added text, and plain black text for common text.

In accordance with a further embodiment of the present invention, the presentation of the tree may additionally indicate which nodes are associated with original documents, and which nodes are associated with presumed documents. For example, nodes associated with only presumed documents may be colored a different color, italicized or grayed. In a different embodiment, a node that is associated with both a presumed document and also an original document will only display an affiliation with the original document, while the affiliation to the presumed document is suppressed from view. In this way, readability is enhanced.

In a further embodiment, the whole tree structure is suppressed from view (or is not created). In this case, groups of documents that each contain a common presumed document are identified. This identification can be made using the algorithms disclosed in this disclosure, or another method. The documents from the group that are the most inclusive are identified and displayed for review. For the purposes of this embodiment, the relationship between the other documents does not need to be determined. This is described with reference to FIG. 8c.

In a further embodiment of the present invention, documents are not only compared for equivalence but also for near-duplication. A method of determining near-duplicate data objects is described below with reference to FIGS. 10-14. Determining that documents are near-duplicates of one another, enables near-duplicate documents to be presented to a reviewer as such. This is very useful for a number of reasons. Firstly, documents that are near duplicates of one another usually refer to the same subject matter, so it is convenient to review them side by side. Secondly, documents that are near-duplicates very often actually begin as identical documents, and are changed in minor ways, by the user, or, inadvertently, by a computer program. Thirdly, the level of near duplication can be variable by a user, enabling the user to define how close to each other two documents need to be in order for them to qualify as near-duplicates, and for the user to have them presented together for review. Fourthly, near-duplicates can pick up the similarity between two documents when the second document is basically identical to the first, but has had added comments interspersed amongst the text. For example, in an email reply, sometimes a user adds a word like "yes" somewhere in the middle of the body text of the email. This additional word can prevent the two documents—the email reply, and the email to which it is replying—from being strung together on the same tree. Yet the process steps for near duplication can indicate that the rest of the text is basically identical, which can help a reviewer understand the relative context of the two emails.

The following represents the use of comparison for near duplication, in accordance with an embodiment of the present invention. In the process of comparing the documents for duplication, the documents are also compared for near-duplication. At least a portion of the body text of each document is compared for near-duplication with at least a portion of the body texts of other documents. The comparison enables the detection and indication of near-duplicated documents. If near-duplication is found, an association is created between the documents found to be near-duplicates of one another. In accordance with a further embodiment, nodes that are associated with documents that are near duplicates to one another are assigned to the same document set. All other nodes in the trees that contain the near-duplicated nodes, are similarly assigned to that document set, as will be shown with reference to FIG. 7 below. In accordance with a further embodiment, a user is enabled to define the degree of similarity between documents for the documents to be considered as being closely duplicated.

Figure 7:
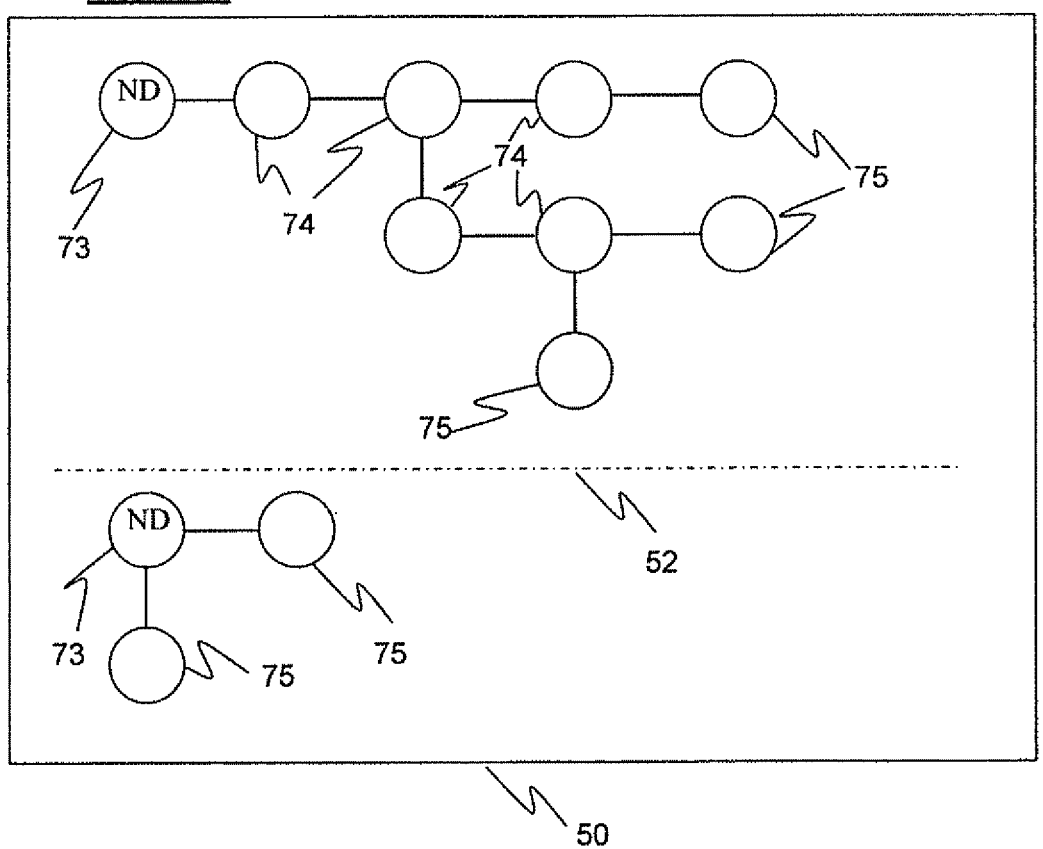
FIG. 7 illustrates a sample display of organizational trees arranged as document sets.

In accordance with certain embodiments, documents determined to be near-duplicates of one another, are not presented as the same node on the same tree, but are presented in combination, that is, in close proximity to one another on a display unit as shown, or otherwise electronically linked to one another. The link indicates the fact that the two trees each contain a node, that are associated with documents that are near-duplicates to one another. For example, a tree has a set of nodes which may be presented on the top section of a computer screen. A document that near-duplicates to any of the nodes of the tree is presented as an individual node directly below the node to which it near-duplicates. Sometimes, a document that near-duplicates to a document in a tree, is itself part of a different tree. In this case, the two trees can be both presented to a reviewer together, and are called a 'document set'. With reference now to FIG. 7, a computer display 50 shows two different trees, each having a root node 73, intermediate nodes 74, and leaf nodes 75. Each of the two trees contains a node that is associated with documents that near-duplicate to one another. The two nodes that are associated with the near-duplicate documents are marked ND. The trees that have nodes that are associated with near-duplicate documents are displayed together to a reviewer, as for example, is shown in FIG. 7, in which the two trees are presented on the computer display 50 simultaneously. The two trees in this non-limiting example are presented one above the other, separated by separating line 52, to indicate that the nodes displayed are not all part of the same tree, but that the displayed trees are related to one another, and part of a single document set. A document set consists of two or more related trees or nodes.

Document sets are another example of data structure. Document sets may be sets of nodes or sets of documents according to their association with nodes. In accordance with an embodiment of the invention, a method for marking the documents as associated with a certain document set is as follows: a first document is associated with a document set; all documents that are associated with a node that is linked to the node associated with the first document (or another previously added document) are then also associated with the document set. All documents that near-duplicate to a document already in the document set are also associated with the document set.

In the present example, the related trees are connected by the fact that one or more nodes near-duplicate to each other between the two trees. The two trees are displayed in close proximity to one another. This is just one specific way of indicating that the nodes associated with near duplicate documents are affiliated with one another. This is only one form of representing the relationship between near duplicates and there are many other acceptable ways to represent them, considered within the scope of the present invention.

In a further embodiment of the present invention other forms of document sets are described, enabling two or more trees to be affiliated with one another, indicating that they probably contain related subject matter. In a case where the documents are emails, there are email programs that store message identifiers to identify individual emails with a string of characters. When a user presses Reply-to, or Forward, in order to construct his email based on a previous email, these email programs create the message identifier for the new email to include a reference to the previous email. By parsing the message identifier, it is possible to determine which emails are replies or forwarding of which other emails. These emails are likely to be related to one another, so such emails are grouped together in a document set. In other words, emails whose Message ID indicate that they are connected to one another are not strung together on the same tree, but the trees in which each of them are nestled are presented together on the screen.

In a further embodiment of the present invention, document sets are constructed based upon a Conversation ID. Conversation ID is a feature of Microsoft Outlook, and is similar to the Message identifier described in the previous paragraph. Basically a Conversation ID contains a string of characters identifying an email. The basic character string for a new email may be 44 bytes long. When a person replies to, or forwards the email, an additional 10 bytes are added to the 44 byte string. Thus it is easy to see which emails are replies to other ones. Documents identified as being related to one another based upon Conversation ID are presented as document sets. The fact that their subject matter is likely to be related is indicated to the reviewer by the presentation of two or more trees in close proximity, or linked to one another. In accordance with one embodiment, a method for the invention includes creating an association between nodes that are associated with documents having related Conversation ID or Message ID indicators. The documents may be displayed grouped according to document sets.

Figure 8A:
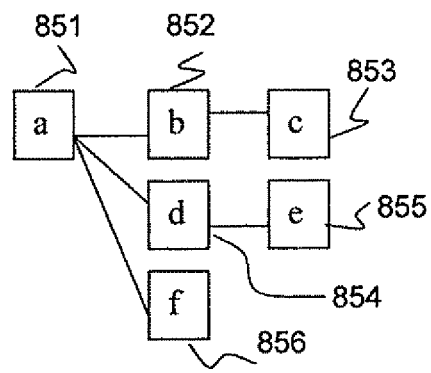
FIG. 8a illustrates a prior art tree.

The above description describes the use of trees and nodes in representing duplicating documents, parent-child relationships, and near duplicates. The following description relates to different types of trees. In FIG. 8a, a (prior art) tree of documents is shown, such as may be created with the Prior Art of constructing a tree solely using Conversation ID Trees, of Microsoft Outlook. The tree is created for an occurrence known as Scenario 1, as follows. Scenario 1 represents the following exchange of emails. Document a is a first email sent by a sender to three recipients. Documents b, d, and f, are three identical replies from the three recipients. This can happen for example if the sender had asked them to respond with a "yes" or a "no". Various metadata fields such as the "from:" field parameter, are different between the three identical, or duplicate, emails b, d and f, yet the body texts are substantially identical. Documents c and e are two different, responsive, further replies, from the sender to two of the three recipients. All of these documents have been extracted from the sender's email program, and arranged into a tree.

As may be seen in FIG. 8a, each email is associated with a different "node", or icon on the tree, since these icons by definition for this prior art only contain one document. There are therefore six nodes, or icons, on the tree, namely 851-856, showing the exchange. For purposes of simplicity, it has been assumed in Scenario 1 that the subject line was not changed during the exchange of emails, and that only the emails from the sender's computer are available. Note that even if there would have been a thousand different email replies instead of just three (b, d, and f), the tree would have had been massive to accommodate the thousand different nodes, or icons, one per document.

In FIG. 5b, a tree of nodes according to certain embodiments of the present invention is shown. The same documents from Scenario 1 are organized, but this time the tree need only contains four nodes, namely (861-864), associated with the four different emails. Node 861 is associated with document a, Node 862 is associated with documents b, d, and f, Node 863 is associated with document c, and Node 864 is associated with document e. The tree of Figure Ab is significantly more compact than that of Figure Aa, since it contains fewer nodes. This reduces the representational space on the display that is required, and also slashes review time for a reviewer.

Figure 8B:
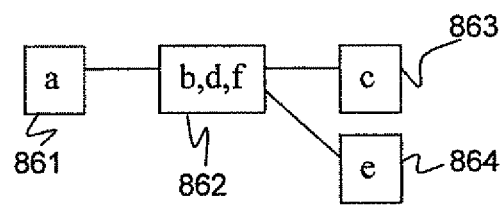
FIGS. 8b-8c illustrate two types of trees in accordance with embodiments of the invention.
Figure 8C:
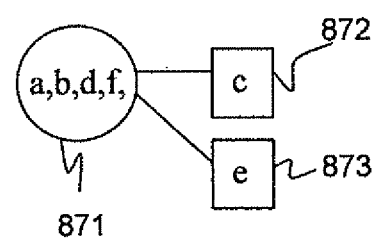

In FIG. 8c, a tree having only a trunk and leaf nodes, according to a different embodiment of the present invention, is shown. As mentioned above, according to certain embodiments, another output of the present invention is when all documents containing the same included document are identified as a subgroup. From this subgroup of documents, the documents that are most relevant may be the inclusive documents. These are therefore associated with leaf nodes on a tree. In the trunked tree, as shown in FIG. 8c, all the non-inclusive documents are not displayed as nodes, but are all grouped together into the trunk. A table affiliating the documents and their header parameters may certainly be provided. The only nodes that need be shown for the trunked tree are the leaf nodes. In FIG. 5c, the same documents from Scenario 1 are organized, but this time, there is only one trunk 871 and two leaf nodes 872-873. The trunked tree may be built according to a method described above for building nodes and trees, while not differentiating between nodes except leaf nodes, or using another method entirely. The trunked tree can have associated with the trunk a number of documents having different subject parameters, so long as all include the same included document (whether original or presumed). It has been described above the characteristics that determine whether a document is considered included within the body text of another.

According to this embodiment, the data structure comprises one or more trees, in which a tree comprises at least a trunk and at least one node. Each node is associated with a document, and the trunk is associated with (zero or more) documents. All documents whose body text includes the same included document are associated with the same tree, and each unique inclusive document, as well as documents that duplicate to this unique inclusive document, is associated with one of the nodes of the tree. Each included document, as well as documents that duplicate to included document, are associated with the trunk of the tree.

One method for producing the trunked tree is using the embodiments described above with respect to FIGS. 3-6. When the tree is built, any nodes that are associated with documents that match presumed documents, or are associated directly with presumed documents, are associated with a trunk 871—these are the documents for which a more inclusive document exists. According to an embodiment of the invention, the trunk is suppressed from view, or, alternatively, it is displayed.

In one embodiment, in order to preserve header parameters associated with parent nodes, the header parameters of all the documents associated with the trunk are associated with the leaf nodes. In other words, if a document associated with the node has had a presumed document constructed from it, one can additionally affiliate header parameters from all the documents that matched the presumed documents with the node. This is because the nodes associated with the presumed documents have been suppressed from display.

In accordance with a further embodiment of the present invention, another form for outputting documents, that have been arranged according to inclusiveness, is provided, as opposed to presenting them as trees. The trunk or the nodes may be displayed with one of many forms of tree symbolism; yet display alternatives also exist, as will be shown. Documents associated with the trunk or the node are identified as being grouped according to their association with the trunk or tree, but do not have to be presented in terms of the group.

As shown in FIG. 8d, according to this embodiment, a subset of documents from the original group of documents is presented. The documents are not necessarily displayed in their entirety; they may just be provided as a list, as shown in the first column of FIG. 8d. The subset includes only a single copy of the inclusive documents, that is, Documents c and e. In other words, the subset includes all the original documents, except those documents that are duplicate of a presumed document, and it also excludes all presumed documents. In accordance with one embodiment, the documents that do not exhibit in the subset (i.e., they are suppressed) are nevertheless available for a reviewer to see, if such is desired. For example, these non-exhibiting documents can be affiliated with the documents of the subset to which they duplicate, or from which a presumed document to which they duplicate is derived or constructed. Or, according to another embodiment, all the nodes are displayed in a subset, while nodes associated with presumed documents are suppressed from the subset display. In this way, all included emails, (these are the documents that are associated with presumed documents) are not shown in the subset display. In a further embodiment, header parameters for each document associated with a displayed node of the subset are shown in a data table of the node. Header parameters for each document associated with a suppressed node from the subset are also shown in the data table of the displayed node of the tree. The displayed node with which the data table of suppressed nodes is associated is the node that is associated with the document from which the presumed document associated with the suppressed node is constructed, i.e. the inclusive node.

In another example, shown in FIG. 8d, a further column is added, listing and linking (affiliating) all the included documents with the inclusive document that they are included in. According to further embodiments of the invention, other details are added to the list of inclusive documents, for example, an indicator that one of the documents had an attachment. According to a further embodiment of the invention, if a duplicate to an inclusive documents exists, this duplicate would be listed in the same cell as the inclusive to which it duplicates. For example, the cell entry might be "c,h,", in which h is a duplicate to c, an inclusive document. According to an embodiment therefore, a processor is configured to display the documents as a list of grouped entries, in which each grouped entry includes the documents associated with a leaf node, a leaf node being a node that has no descendant nodes. These documents are the inclusives. The documents can be referred to with their numeric identifiers. In a further embodiment, each grouped entry further includes a listing of the documents associated with nodes of which said leaf node is a descendant.

In accordance with another embodiment of the present invention, another form for outputting documents, that have been arranged according to inclusiveness, is provided, as opposed to presenting them as graphical trees. For example, documents may simply be listed in the data structure in sequential order and be supplied with a column listing indicating with which tree, and with which section of the tree, they are associated. As shown in the first column of FIG. 8e, all the documents of the original group are listed in a data structure, for example in a first column. A notification is provided in the third column, adjacent to the list, to indicate which documents are the inclusive documents. In accordance with another embodiment, and as shown in the second column of FIG. 8e, further indication indicates the position a node for the document would assume if it were to be displayed upon a tree. For example, the node address for document b, d and f, is 10:10:11. They all have the same node address because they are duplicating documents. The node address indicates that they feature in Tree 10, in Thread 10, and in Position 11. These numerical values for tree, thread and position need not necessarily start with 1, for example. Thread 10 may be the first thread of the tree. According to a further embodiment, another parameter can be added to the address, to indicate which document set the tree belongs to. According to certain embodiments the columns can be sorted by a user, for example, if the data structure is in the form of a spreadsheet, they may be able to be sorted according to one of more of the following criteria: document identifier, document sets, numeric node address, an inclusive flag, and also, a 'first copy of an inclusive flag'. This latter flag would direct a reviewer to read only one (arbitrary) copy of the inclusive.

According to another embodiment, as shown in FIG. 8f, an EquiSortAttach field is utilized for indicating the position the attachments would assume if they were to be displayed upon a tree. When representing the tree in a linear form (e.g. a table) this field enables to view emails together with their corresponding attachments. More specifically, according to certain embodiments, as was mentioned above, email attachments may also be used for comparing between different emails; accordingly, emails are considered matching emails only if the fingerprints of the email attachments are also the same. Thus, two matching emails, which include attachments, and are positioned in the same node, are represented in the Node Address column (see FIG. 8e and FIG. 8f) by the same numeral representation. However, as it is often important for users to review all attachments, each attachment is assigned with a unique identifying number, and as shown in FIG. 8f (EquiSortAttach column), which is an expansion of FIG. 8e, all attachments corresponding to a single node are listed according to their positions and their identifying number.

For example, one way for identifying email attachments may include the following general expression: {'E', thread, family, type, attachment id} wherein the expressions before the '#' sign correspond to the position of the node and the expressions after the '#' sign correspond to the elements contained within the email. The symbol 'E' refers to the tree identifier and the "thread" is the position of the current node. Consider for example, an email containing a subject, a body text, and three attachments. All elements which are part of this email are designated under the same family (i.e. the subject, the body text and the attachments). The subject, the body text and attachments, each belong to a different type. For example, the subject may be type A, the body text type B and the attachments may be type C. The attachment id identifies the different attachments.

In the example shown in FIG. 8b, according to certain embodiments, node 862 contains emails b, d, and f which all may have the same three attachments. As shown in FIG. 8f (Node Address column) all three emails are located in the same node (i.e. 10.10.11) as they are identical. As shown in FIG. 8f column EquiSortAttach shows unique identifiers which are given to the content of each email. The tree and the position of the node are shown first, as was explained above with reference to the Node Address column (See FIG. 8e). The number after the sign corresponds to the family number (i.e. the relevant email out of the three emails in the node) in the example in FIG. 8f: email 'b' has the family identifier 2, email 'd' has the family identify 7 and email 'f' has the family identifier 12. The second number after the '#' sign corresponds to the type of the content element. In this case a body text is designated as type A and an attachment is designated as type C. The last number is the identifier of the content element and according to certain embodiments corresponds to the DocId which is a unique identifier given to each individual component within each family (represented in the most left column of FIG. 8f). By sorting the list according to the EquiSortAttach column, all emails with their corresponding attachments, are displayed together.

According to certain embodiments, an "inclusive minus flag" may be added to the spreadsheet, in order to indicate to the user that an inclusive node is in fact missing an attachment. According to certain embodiments, a node that is designated as an inclusive node may lack an attachment that is present in previous emails. For example, both nodes 36 and 37 in FIG. 5e are considered inclusive. However, while node 36 contains all elements (including attachments) of previous nodes in the same thread of the tree, and is indeed inclusive, node 37 includes all subjects and body text but lacks the attachment which is present in node 35. This could result for example, when a node (e.g. 37) corresponds to a reply email which was sent back without an attachment document which was included in the original received email (e.g. node 35). The inclusive minus flag indicates to the user that in order to read the complete inclusive content, the user must refer to previous emails.

In another example, the columns could represent trunked trees as shown in FIG. 8c, and the address column would indicate the tree to which the document is associated and whether it is associated with a root node or the trunk. These examples are only intended for exemplary purposes, and do not seek to limit the number of ways that numerical or written indicators are able to describe the arrangement of a document relative to others, arranged according to duplication and inclusiveness.

There have been described above, many non-limiting different ways in which documents can be arranged according to duplication, inclusiveness, and, according to certain embodiments, according to document sets. The following seeks to describe document properties and document sources that can be used in accordance with embodiments of the invention.

Another benefit of an embodiment of the present invention is its ability to have access to files such as emails from different computers, or from different email archives, for example different PST files. According to certain embodiments, the operation of the invention is not to immediately assign documents extracted from different bulk files to different trees, but rather assigns documents to trees according to inclusiveness, irrespective of which file the document originated from. Thus a tree may be composed of documents originating from a number of different trees. According to further embodiments, it is also irrelevant whether the documents were in whole document format or needed extraction to document format before the invention is applied. Similarly, the invention is not limited to only associating documents with nodes on the same tree if the subject parameter for all the documents is the same. On the contrary, for different nodes, the subject parameter may be different, but as long as the documents satisfy the inclusiveness condition, they may be associated with nodes of the same tree.

Figure 9:
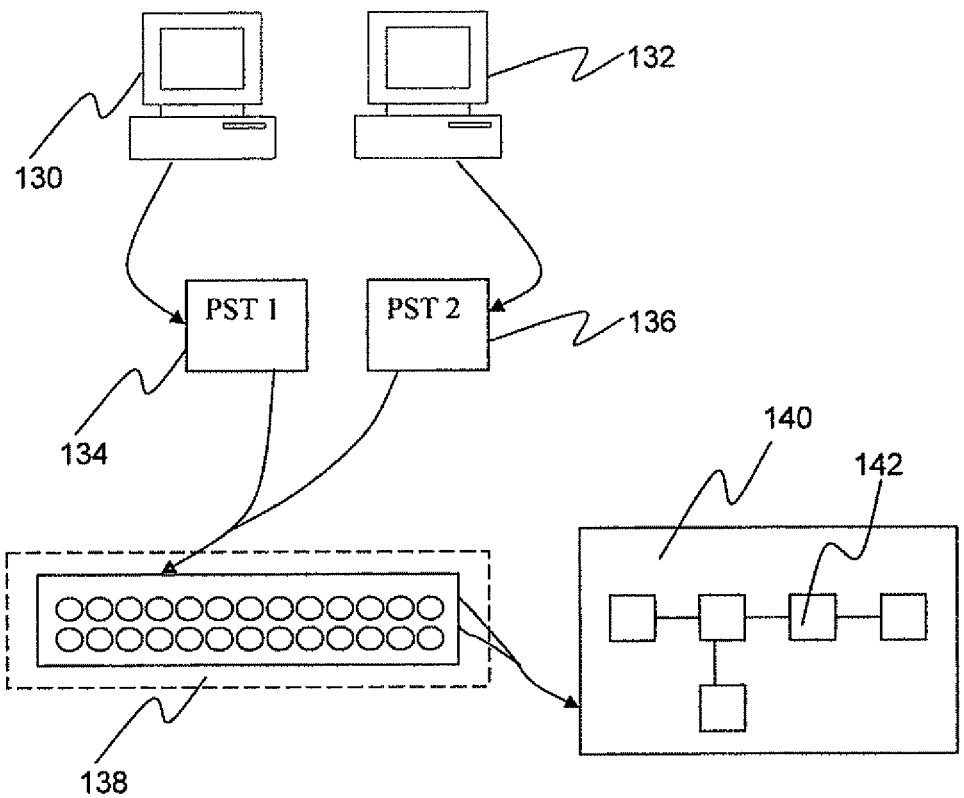
FIG. 9 illustrates how the contents of two processors may be arranged together in trees, according to an embodiment of the invention.

FIG. 9 shows 2 computers, 130 and 132, from which many documents are to be extracted and organized. For example, each computer contains a PST file, 134, 136. Each PST file contains, or has available for extraction, many email documents, or emails for short. Array 138 shows how these files can theoretically be stored all together, irrespective of which PST they are extracted from. In certain embodiments, array 138 is included. In other embodiments, the array does not need to exist, although the documents may still be extracted from multiple sources. Tree 140 shows how the files from array 138, originating from each of the computers, are together organized as a tree or trees, according to their degree of inclusiveness. Tree 140 includes one or more nodes, each node associated with one or more documents, for example emails.

As mentioned before, according to certain embodiments, a node can even be associated with a "presumed document"— or a "presumed email"—an document that has not been extracted from either of the PSTs 134 or 136, but is nevertheless presumed to have existed once, since a header for it, and text, is included within the text of a document that is found in one of the PSTs.

As mentioned, Tree 140 includes a number of nodes 142, and each node is associated with one or more documents. Each document is associated with its own node, unless the document duplicates to another document. If the document is a duplicate of another document, both of them are associated with the same node. Each node forms its own tree, unless it is a descendant of a different node. From the contents of more than one PST, it is expected that a high number of different trees will be used to organize the documents. A node belongs to a tree if it is a descendant of another node in the tree.

Figure 10:
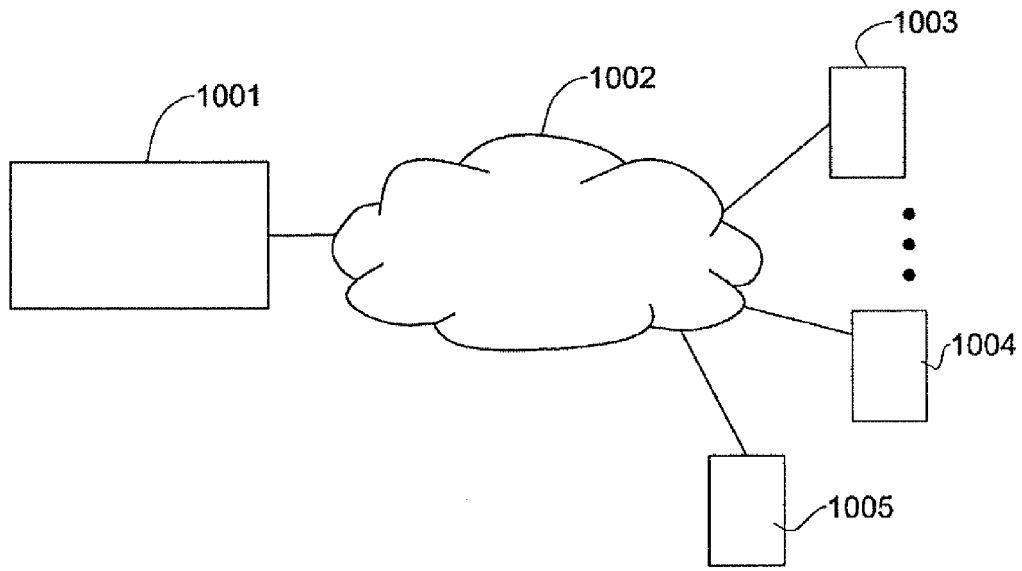
FIG. 10 illustrates a general system architecture for determining near duplicate data object, in accordance with an embodiment of the invention.

A method of determining near duplicate data objects will now be described in reference to FIGS. 10-14. Attention is first drawn to FIG. 10, illustrating a general system architecture, in accordance with an embodiment of the invention. Thus, system 1 is configured to receive through medium 1002 documents from one or more sources (of which three 1003-1005 are shown in FIG. 10). The system 1001 is configured to process the documents and to output indications, which documents are near duplicate. The medium 1002 may be local such that the one or more sources (1003 to 1005 in the example of FIG. 10) are stored in a storage medium associated with the system 1001. In accordance with another embodiment, the documents are stored remotely and are transmitted, through, say, the Internet 1002. System 1001 may be a single computer or two or more processors accommodates locally or remotely one with respect to the other (not shown in FIG. 10).

Note that by one embodiment, the near duplicate indication can be provided as a service. Even as a service, there are few options: for instance, the files are sent to a service bureau or, in accordance with another embodiment, the application is activated via a web-service. By this embodiment, documents stored at the subscriber site (say 1003 to 1005 in FIG. 10), are transmitted to a near duplicate service (say 1001 in FIG. 10) and are processed to determine which documents are near duplicate. The processing will be described in further detail below. The indication (possibly which are near duplicate documents) is transmitted to the subscriber, and the latter is charged according to one out of few possible charging schemes. The charging schemes include: pay per document (or some quota of documents) checked, pay per document (or some quota of documents) that is found to have a similar or exact duplicate, one time license for the software or software rental per period, OEM agreements, and others.

The subscriber may be a one time subscriber, or by way of another example, a subscriber that requires the service repeatedly. Note the invention is not bound to use by only subscribers, and accordingly, different kind of users may utilize the system and method of the invention.

The invention is not bound by any specific application. Thus, by way of non-limiting example, the near duplicate technique can be used for determining near duplicate documents in a portfolio of documents processed during M&A, between two companies or more.

Figure 11:
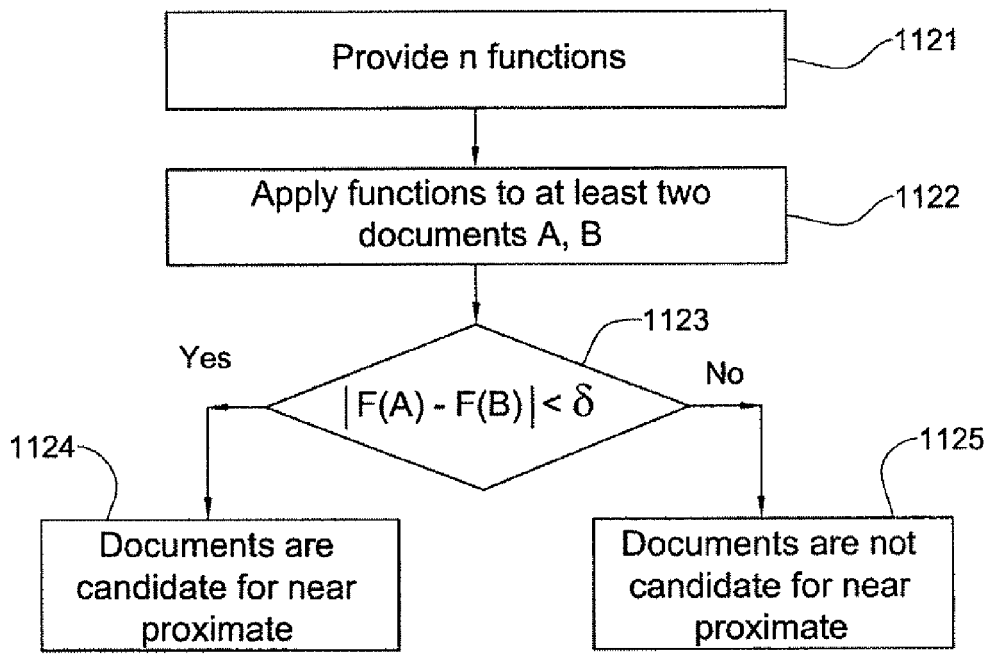
FIG. 11 illustrates a generalized sequence of operations for determining near duplicate data object, in accordance with an embodiment of the invention.

Bearing this in mind, attention is drawn to FIG. 11, illustrating a generalized sequence of operations, in accordance with an embodiment of the invention. Thus, at the onset, at least two different functions (say by this example $f1$ and $f2$) are provided 1121. Each function is from the space of document content to a number.

In accordance with a certain embodiment, each function having a function value bound by a respective minimum value min and a maximum value max. In accordance with certain embodiment, all the functions share the same minimum and maximum values (say 0 and 1 respectively).

Typical, yet not exclusive, example of functions is the known per se classifiers capable of discerning whether input data belongs to one group or the other. Examples of classifiers are Bayesian Classifier, Decision Trees, Support Vector Machine as disclosed in U.S. Pat. No. 5,950,146. As is known, classifiers are, as a rule, constructed on the basis of two training groups.

As is well known, in operation (following the training session), if a classifier is applied to a document, it will produce a score that reflects the association of the tested document to one of the training groups. For instance, if the classifier is trained on the basis of documents belonging to a first group (documents that relate to sports) and documents belonging to a second group (documents that relate to financials), then in operation, the score of a tested document would indicate how close it is to one of the specified groups, e.g. the closer the score of the tested document to 0, it is associated to the first group and likewise, the closer the score of the tested document to 1, it is associated to the second group.

In accordance with certain embodiments, a function can be, for example, the number of features in the document. A feature for instance, may be a given word, two consecutive words, etc. In still another embodiment, a function is a distance function. In accordance with certain embodiments, where a distance function(s) is used, each document is represented by a vector of numbers. Each number in the vector indicates, say the frequency (or count) of a specific word (or other combination of words) within the document. For instance, the first value (number) in the vector signifies the number of times that the word "word" appears in the document. The second value in the vector signifies the number of times that the word "other" appears in the document, and so forth.

Given now two vectors (say, for example, of the kind specified above), a distance function can be applied. For example, $L^\infty$ (Maximum distance), $L^2$ Euclidian distance (sum the squares of different values), $L^1$ (sum of the absolute differences), Jansen-Shannon divergence, etc.

Note that the invention is not bound by the specified functions, which are provided by way of example only.

In accordance with certain embodiments, a hybrid or combination of functions can be used. For example, $f1$, and $f2$ are classifiers, and $f3$ and $f4$ are distance functions. Other variants are applicable, depending upon the particular application.

Having described the characteristics of various functions, attention is drawn again to FIG. 11. The next stage (after providing at least two functions) is that the functions are applied to the documents 1122. Any two documents A, B are determined to be candidates for near duplicate with level th if a condition is met. The condition includes: for any of the functions $f1$ and $f2$ (in the particular case that two functions are provided and for any of the n functions in another case that n functions are provided), when applied to documents A and B, $|f(A)-f(B)| \le \delta(f, th, A)$, where $\delta$ is a function of at least $f$, th, and A. (1123). Threshold th indicates the level of certainty of candidates for the near duplicate test. Consider, by way of non-limiting example, that a function $f$ is number of words and a document A having, say 250 words. If the threshold th equals 0.8, this means that documents having number of words ranging from 200 (0.8·250) to 312 (1.25·250) meet the criterion of near duplicate to document A for this particular function. Note that using a threshold of the kind specified is by no means binding.

Note that in certain embodiments $\delta(f, th)$, wherein $\delta$ is dependent upon at least $f$ and th.

Note that in certain embodiments $\delta(f, A)$, wherein $\delta$ is dependent upon at least $f$ and A.

Note also that, in accordance with certain other embodiments, the threshold is not a parameter of the function $\delta$.

Note that the specified examples are not binding and accordingly, in certain embodiments, the condition may include additional requirements or requirement that need(s) to be met for meting the candidate for near duplicate condition.

Reverting now to the previous example, $\delta$ is dependent on $f$, th and A. Thus, in accordance with certain embodiments, in the case that the function $f$ is bound by a minimum value, min and maximum max (say, a classifier bound by the resulting values r ($0 \le r \le 1$)), then said $\delta(f, th) = \alpha(th) \cdot |max-min|$, as will be explained in greater detail below. In accordance with certain embodiments, $\alpha$ can be selected to be in the range of $0 \le \alpha(th) \le 0.6$. In accordance with other embodiments where the function $f$ is not bound by a minimum value, min and maximum max (say for example certain distances functions), then $\delta(f, th, A) = \alpha(th) \cdot (A)$ as will be explained in greater detail below. In accordance with certain embodiments, $\alpha$ can be a value selected in the range of $0 \le \alpha(th) \le 0.6$.

In accordance with certain embodiments, when the function is total number of words in a document or a classifiers, then $\alpha(th)=1-th$. Assuming, for instance, that a function $f$ being number of words, the document A having 250 words and threshold th=0.8. Now, by this example, $\alpha(th)=1-th$, namely 0.2. $f(A)$ is 250, and accordingly $\delta(f, th, A)=\alpha(th)\cdot f(A)=50$. This means that documents having number of words between 200 and 300 (i.e. $f(B)$ in the range of 200 to 300), will comply with the algorithmic expression $|f(A)-f(B)|\le\delta(f, th, A)$, (namely, $|250-f(B)|\le 50$). Note that the invention is not bound by the condition $\alpha(th)=1-th$. Note also that the invention is not bound by the specified characteristics of $f$ (i.e. the specified examples of $f$ bound by max/min or, not).

If the specified conditions are met, then the documents A and B are determined to be candidates for near duplicate (1124), and if the condition is not met, they are not candidates for near duplicate (1125). Note that setting α to 0.6 is an example only. In accordance with another embodiment, it is 0.5 and in accordance with yet another example it is 0.4, and in accordance with still another embodiment, it is 0.3 and in accordance with still another embodiment, it is 0.2. These values are examples only and can be changed depending upon the particular application. For example, if the condition for determining candidates for near duplicate may also stipulate the number of classifiers used, it may affect the value of α. For instance, the larger the number the classifiers used, the lower the maximum value of α.

Note that a specific value can affect the desired resolution of determining near duplicate indication. For instance, in the case that $\alpha=0.1$, this means that if a function $f$ (say, in the specific case that $f$ is a classified bound by the values 0-1) when applied to documents A and B gives rise to $|f(A)-f(B)|=0.11$, it indicates that documents A and B are not candidates for near duplicate. If, on the other hand, $\alpha=0.15$, the same documents are regarded as candidates for near duplicate.

Note that in accordance with certain embodiments, the processes described above with reference to FIGS. 10 and 11, give rise to candidates for near duplicate indication, rather than final near duplicate indication. As will be explained in greater detail below, by these embodiments, additional processing phase is applied in order to determine whether candidates for near duplicate are indeed near duplicate documents (in higher degree of certainty), or not.

Those versed in the art will readily appreciate that the invention is not bound to only two documents and to only two functions. In fact, in accordance with certain embodiments, the more are the functions, the higher the prospects that the near duplicate indication is accurate.

Figure 12:
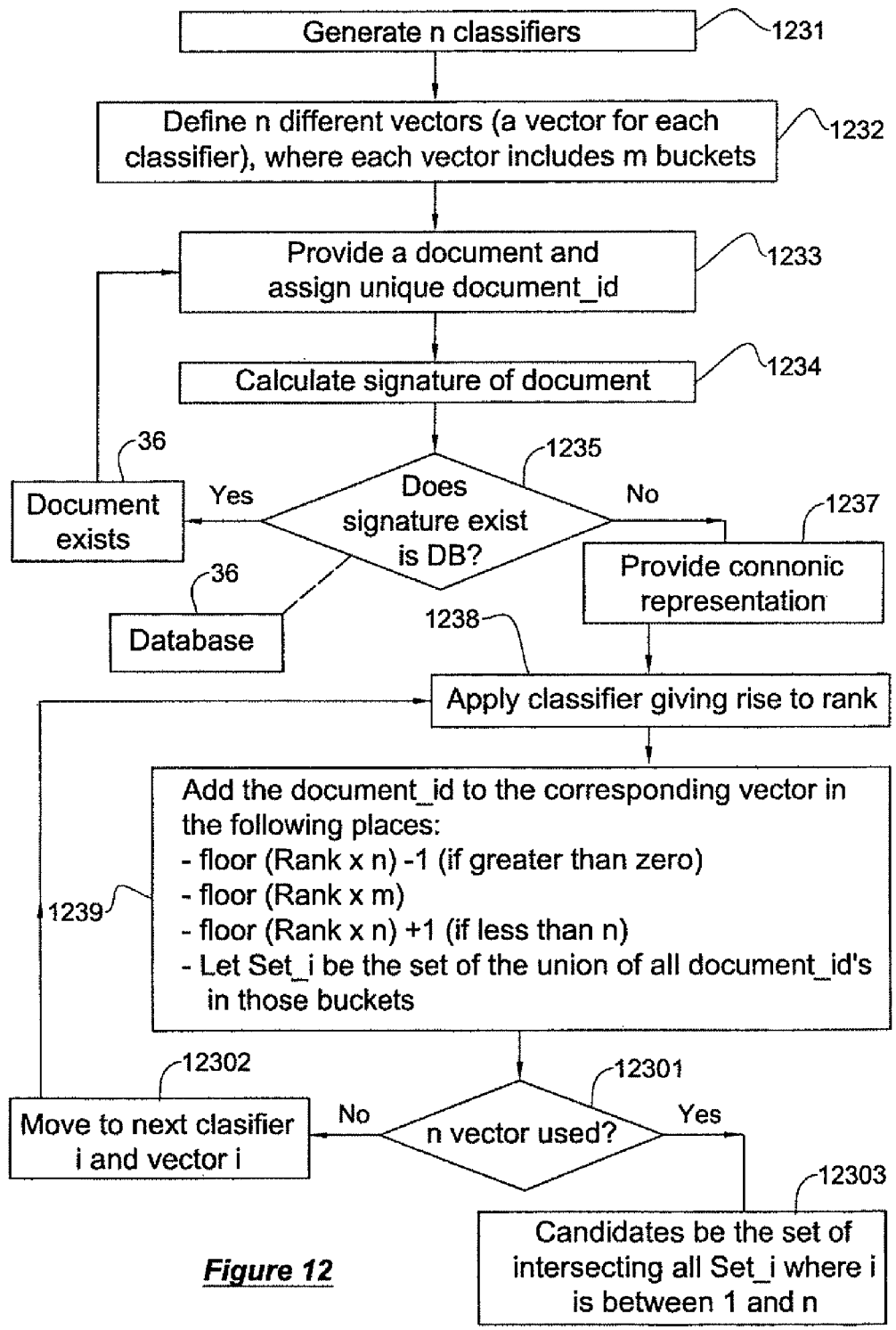
FIG. 12 illustrates a more detailed sequence of operations, in accordance with an embodiment of the invention.
Figure 13:
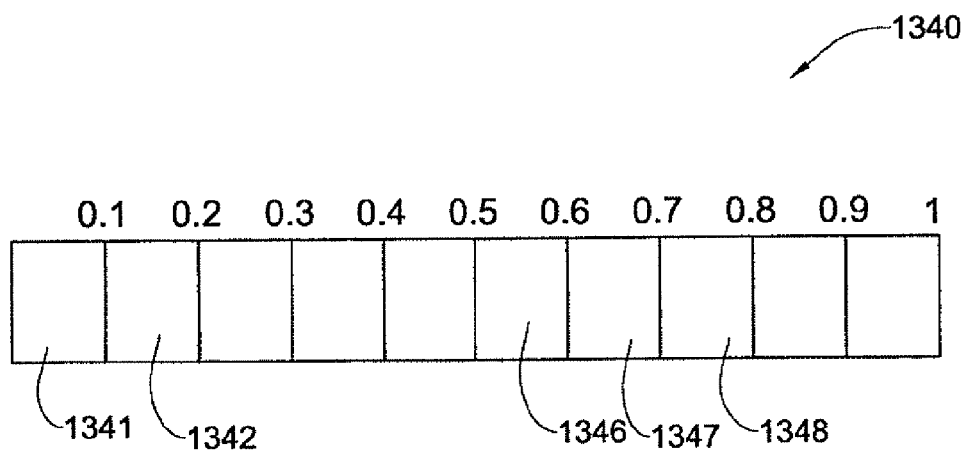
FIG. 13 illustrates an exemplary vector of buckets, used in one embodiment of the invention.

Turning now to FIG. 12, there is shown a more detailed sequence of operations, in accordance with an embodiment of the invention. As will be explained in greater detail below, in accordance with this embodiment, there is provided an additional technique for accomplishing improved performance. Note that by this embodiment, the functions that are used are classifiers of type SVM. Note that the invention is not bound by the use of functions in the form of classifiers and a fortiori not by the use of the classifier of the type. Note that the specific example with reference to FIG. 12, refers to $0<\alpha\le 0.6$.

Thus, at the onset, m (at least two) classifiers are received or generated 1231. For each classifier, a different vector is generated with n different values. By one example, the vector values are buckets 1232. Next, a document under consideration is received and is associated with a unique identification code 1233. Next, a signature of the document is calculated say by applying known per se checksum calculation 1234. There is further provided a database 12304, say, hash table, storing signatures of existing documents. In the case that the so calculated signature of the document exists in the database, this indicates that the document already exists 1235 and control is returned to 1233 for processing the next document. If, on the other hand, the signature does not exist, this indicates that the exact document does not exist and there is a need to determine whether this document is near duplicate to other documents. If necessary, the text of the document (say, e.g. a Microsoft Word™ document) is extracted and converted to canonical representation 1237, all as known per se. Thereafter, a list of features (say, the known per se shingles, normally A k-shingle is a sequence of k consecutive words) is calculated in a known per se, manner. By this non-limiting example, the 1 list of features being 1-gram (frequency of words in the document), 2-grams (frequency of consecutive 2 words in the document), etc. The invention is not bound by a specific manner of calculating the features.

Next, the classifier is applied on the document (by this example to its representatives list of features), giving rise to a first function result (38) for this particular document identification. Note that the classifiers result (m classifiers) is bound by min–max values, and by this particular example, a value that falls in the range of 0 to 1. As may be recalled, the invention is not bound by the use of functions bound by min/max value and a fortiori not those that have min value=0 and max value=1. Also, as may be recalled, a hybrid (or combination) of functions can be used, and accordingly, in certain embodiments, one or more functions can be bound by min/max value and in accordance with other embodiments, one or more functions is not bound by min/max values.

Before moving on, note incidentally, that in accordance with an embodiment of the invention, this procedure is repeated for at least one additional classifier (applied to the same document id), giving rise to a second function result (also falling in the range of 0 to 1). For convenience, the first and second results are marked as $f_1(A), f_2(A)$, where A is the document under consideration. Now, if function results of applying these classifiers to another document (B) are available, say $f_1(B)$ and $f_2(B)$, it would be possible to determine whether, the documents are near duplicate. Thus, the documents would be regarded as near duplicate if $|f_1(A)-f_1(B)|\le\alpha$ and $|f_2(A)-f_2(B)|\le\alpha$, where by one embodiment $\alpha=0.3$.

In accordance with certain embodiments, in the case where the value of the function is not bounded by a "small" number, the bucket implementation is less applicable. Therefore, in certain embodiments, a known per se "near neighbor algorithm" is used. Thus, for each document the values of the m different functions are calculated, and fed to the "near neighbor algorithm", as an m-dimensional point. The "near neighbor algorithm" can be queried on all points that are "close" to a certain point. Hence, an efficient algorithm is obtained to find all documents that are "close" to a certain document, Note, that in certain embodiments the "approximate near neighbor algorithm" can be used in order to speed-up performance.

Reverting now to the embodiment of FIG. 12, a procedure for expediting determination of near duplicate documents is applied. Note that each vector is divided to n values (buckets by this specific example), where n is say 10. Thus, for the case of range 0 to 1, each bucket covers a range 0.1 as shown in the exemplary vector 1340 of FIG. 13. By this example the buckets are numbered 1 to 10, where the first bucket 1341 covers the values 0-0.1, the second vector 1342 covers the values 0.1 to 0.2, and so forth. In the general case for n buckets, each bucket is of size 1/n.

Bearing this in mind, assuming that applying the first classifier to document A (i.e. $f_1(A)$), gives rise to function result rank (in this example rank is between 0 and 1), then the result (in fact the document id) is assigned to the buckets in the following manner (1239): 1) Floor(n·rank) (if greater than zero, otherwise discard this option), Floor(n·rank)+1, and Floor(n·rank)+2 (if less than n, otherwise discard this option). n as recalled is, by this example, 10. Thus, if the rank value is say 0.69, then applying the specified stipulation would lead to bucket 6 (covering the value 0.5 to 0.6), 7 (covering the value 0.6 to 0.7) and 8 (covering the value 0.7 to 0.8), associated with reference numerals 1346, 1347 and 1348, respectively.

Put differently, the document id of this document is assigned to buckets 6, 7 and 8.

Now, as an interim step, the union of documents Ids in the buckets are calculated (for this particular classifier) and is stored in a union set for this classifier. For instance, assuming that the document identification of the present document (which, as recalled, is assigned to buckets 6, 7 and 8) is $Id_{current}$ and a previous document having, say $Id_{prev}$ that was set (for the same classifier) to, say buckets 8 and 9 (in accordance with the calculating steps discussed above), then in accordance with this step, the union set for this classifier would store $Id_{current}$ and $Id_{prev}$, since bucket 8 stores both $Id_{current}$ and $Id_{prev}$. Moving on with this example, if the identification $Id_{prev-1}$ of another document is set to, say 1, 2 and 3 (in accordance with the calculating steps discussed above), then $Id_{prev-1}$ is not included in the union set for this classifier (together with $Id_{current}$ and $Id_{prev}$), since $Id_{prev-1}$ and $Id_{current}$ do not share any bucket (in other words, the union operator results in an empty set).

The procedure is repeated for the other n vectors of the m classifiers (12301 and 12302) [by this specific example 2 classifiers], giving rise to n different union sets. Each set holds (for its respective classifier) the documents ids that share a common bucket.

What remains to be done is to apply intersection to the specified sets (12303). The result would be document Id's that share at least one bucket for every one of the m classifiers. These documents are announced as candidate near duplicate.

Note that the utilization of buckets in the manner specified, is one out of many possible variants of implementation of the specified condition that $|f(A)-f(B)| \leq \delta(f, th)$ and since the functions are bound by max/min values, then $\delta(f, th) = \alpha(th) \cdot |max-min|$, for the at least two functions (by this example classifiers, the values are between 0 and 1). As may be recalled by this example $\alpha=0.3$. Thus, consider for example two classifiers $f_1$ and $f_2$, where the result of applying $f_1$ to a first document (having document identification $Id_1$) gives rise to a result of, say 0.65, thereby falling, in accordance with the previous example to buckets 5, 6 and 7. When applying the same classifier $f_1$ to a second document (having document identification $Id_2$) it gives rise to a result of, say 0.89, thereby falling, in accordance with the previous example to buckets 7, 8 and 9. Now, the condition for candidates to near duplicate documents is met for $f_1$ since 0.89–0.65<0.3. If the same condition holds true when applying $f_2$ to the two documents (say 0.78 [buckets 6, 7 and 8] and 0.62 [buckets 5, 6 and 7], respectively, giving rise to a subtraction result of 0.16 being less than 0.3), then, the two documents are announced as candidates for near duplicate, since for both functions the condition is met. The same result would be obtained also when using the specific embodiment that implements the buckets. Thus, for the function, $f_1$ documents $Id_1$ and $Id_2$ belong to the same set (since they meet the union condition due to the fact that they share bucket no. 7. They also belong to the same set for function $f_2$ since they share a bucket (by this example bucket 7). The intersection of the sets (in accordance with step 12303 in FIG. 12) would lead to announcing that $Id_1$ and $Id_2$ are candidates for near duplicate.

In the specified examples, the documents A,B to which the functions were applied, were list of features obtained directly or indirectly, such as 1-grams, 2-grams, n-grams, etc.

Note that the mapping to buckets is strongly related to the value $\alpha$. Thus, when a function result is mapped to 3 buckets, each covering a range of 0.1, this results in a tolerance of 0.3, exactly the value of $\alpha$. Accordingly, for the specific case that a function result is mapped to 3 buckets, each bucket size equals to $\frac{1}{3} \cdot \alpha$. Had $\alpha$ would equal to 0.15, then each bucket size would be 0.05 (for the specific case of 3 buckets).

As mentioned before, the invention is not bound by the use buckets, and a fortiori not by the use of 3 buckets.

For a better understanding of the foregoing, consider the following example:

Assume that candidates for near-duplicate documents are found with th=80%, where all functions are bounded by 0 and 1. From the above let $\delta(f, th) = \alpha(th) \cdot |max-min| = \alpha(th)$. In the example let $\alpha(th)=0.2$. Using $\alpha(th)=0.2$, yields the use of $2/\alpha(th)=2/0.2=10$ buckets.

By these embodiments, the number of buckets is always $2/\alpha(th)$ this will insure that if the rank of $doc_1$ is x (0.39) and the rank of $doc_2$ is y (0.58). They will join a same bucket.

| | | | | | Buckets | | | | | |
|---|---|---|---|---|---|---|---|---|---|---|
| Vector | 1<br>0.0-0.1 | 2<br>0.1-0.2 | 3<br>0.2-0.3 | 4<br>0.3-0.4 | 5<br>0.4-0.5 | 6<br>0.5-0.6 | 7<br>0.6-0.7 | 8<br>0.7-0.8 | 9<br>0.8-0.9 | 10<br>0.9-1.0 |
| $doc_1$ | | | X | x | X | | | | | |
| $doc_2$ | | | | | | Y | y | y | | |

Suppose there are 4 documents:

(1) Suppose that search for near-duplicate documents is performed with th=80%, and suppose $\alpha(th)=0.2$; then define $2/\alpha(th)=2/0.2=10$ buckets.

(2) Generate 3 classifiers (2) Define 3 vectors; with 10 buckets each, the buckets are numbered 1-10. Accordingly, by this example, m=3 and n=10.

The ranks (i.e. the results of applying the three functions on the first document are (document__1):

Classifier__1=0.33 (insert to buckets 3,4,5)
Classifier__2=0.44 (insert to buckets 4,5,6)
Classifier__3=0.77 (insert to buckets 7,8,9)

The buckets after insertion document__1 looks like;

| | | | | | Buckets | | | | | |
|---|---|---|---|---|---|---|---|---|---|---|
| Vector | 1<br>0.0-0.1 | 2<br>0.1-0.2 | 3<br>0.2-0.3 | 4<br>0.3-0.4 | 5<br>0.4-0.5 | 6<br>0.5-0.6 | 7<br>0.6-0.7 | 8<br>0.7-0.8 | 9<br>0.8-0.9 | 10<br>0.9-1.0 |
| 1 | | | 1 | 1 | 1 | | | | | |
| 2 | | | | 1 | 1 | 1 | | | | |
| 3 | | | | | | | 1 | 1 | 1 | |

The ranks (i.e. the results of applying the three functions on the second document (document__2) are Classifier__1=0.29 (insert to buckets 2,3,4)
Classifier__2=0.50 (insert to buckets 5,6,7)
Classifier__3=0.81 (insert to buckets 8,9,10)

The buckets after insertion document_2 looks like:

| Vector | Buckets | | | | | | | | | |
|---|---|---|---|---|---|---|---|---|---|---|
| | 1<br>0.0-0.1 | 2<br>0.1-0.2 | 3<br>0.2-0.3 | 4<br>0.3-0.4 | 5<br>0.4-0.5 | 6<br>0.5-0.6 | 7<br>0.6-0.7 | 8<br>0.7-0.8 | 9<br>0.8-0.9 | 10<br>0.9-1.0 |
| 1 | | 2 | 1, 2 | 1, 2 | 1 | | | | | |
| 2 | | | | 1, | 1, 2 | 1, 2 | 2 | | | |
| 3 | | | | | | | 1 | 1, 2 | 1, 2 | |

Applying step 1239 of FIG. 12 (union) in respect of the first function would result in document_1 and document_2 (the set for the first function) since they share buckets 3 and 4. The set of the second function will also include document_1 and document_2, since they share buckets 5 and 6. Likewise, the set of the third function will also include document_1 and document_2, since they share buckets 8 and 9. The intersection of the sets (in accordance with step 12303) would result also in document_1 and document_2 (since they are included in each one of the three sets), and accordingly they are announced as near duplicate.

Moving on to document_3, the ranks of the document_3 are

Classifier_1=0.71 (insert to buckets 7,8,9)

Classifier_2=0.50 (insert to buckets 5,6,7)

Classifier_3=0.81 (insert to buckets 8,9,10)

The buckets after insertion document_3 looks like

| Vector | Buckets | | | | | | | | | |
|---|---|---|---|---|---|---|---|---|---|---|
| | 1<br>0.0-0.1 | 2<br>0.1-0.2 | 3<br>0.2-0.3 | 4<br>0.3-0.4 | 5<br>0.4-0.5 | 6<br>0.5-0.6 | 7<br>0.6-0.7 | 8<br>0.7-0.8 | 9<br>0.8-0.9 | 10<br>0.9-1.0 |
| 1 | | 2 | 1, 2 | 1, 2 | 1 | | 3 | 3 | 3 | |
| 2 | | | | 1, | 1, 2, 3 | 1, 2, 3 | 2, 3 | | | |
| 3 | | | | | | | 1 | 1, 2, 3 | 1, 2, 3 | 2, 3 |

The union step for the first function will yield an empty set, since document_3 does not share any bucket with the previously analyzed document_1 and document_2. Accordingly, it is not candidate for near duplicate to the other documents, since the intersection of the sets is empty (notwithstanding the fact that for functions 2 and 3, the union would result in document_1, document_2, and document_3 included in the respective union sets). Note, incidentally, that had the requirements for determining candidates for near duplicate result would be alleviated, say by requiring that two functions meet the condition, the outcome would be reversed. Put differently, by the latter (alleviated) condition document_3 is announced as near duplicate to document_1 and document_2, since the intersection of the sets for functions 2 and 3 give rise to document_1, document_2 and document_3.

It is accordingly appreciated that the parameters that affect the determination of candidates for near duplicate indication may be configured, depending upon the particular application. Typical, yet not exclusive, example of parameters are the value of δ, the number of functions, etc.

Moving now to document_4, the ranks of the document_4 are

Classifier_1=0.55 (insert to buckets 5,6,7)

Classifier_2=0.55 (insert to buckets 5,6,7)

Classifier_3=0.55 (insert to buckets 5,6,7)

The buckets after insertion document_4 looks like

| Vector | Buckets | | | | | | | | | |
|---|---|---|---|---|---|---|---|---|---|---|
| | 1<br>0.0-0.1 | 2<br>0.1-0.2 | 3<br>0.2-0.3 | 4<br>0.3-0.4 | 5<br>0.4-0.5 | 6<br>0.5-0.6 | 7<br>0.6-0.7 | 8<br>0.7-0.8 | 9<br>0.8-0.9 | 10<br>0.9-1.0 |
| 1 | | 2 | 1, 2 | 1, 2 | 1, 4 | 4 | 3, 4 | 3 | 3 | |
| 2 | | | | 1, | 1, 2, 3, 4 | 1, 2, 3, 4 | 2, 3, 4 | | | |
| 3 | | | | | 4 | 4 | 1, 4 | 1, 2, 3 | 1, 2, 3 | 2, 3 |

As readily arises from the foregoing, document_4 is included with document_1 in the same union set for the first function (since it shares bucket 5 with document_1 and bucket 7 with document_3). Document_4 is included with document_1, document_2 and document_3 in the same union set for the second function (since it shares bucket 5,6 and 7 with document_1, document_2 and document_3). Likewise, document_4 is included with document_1 for the third function (since it shares bucket 7 with document_1, and document_4). The intersection between the sets (in accordance with step 303) leads to announcing document_4 as near duplicate to document_1.

Note that the mapping of a document to buckets in respect of a given function may be regarded as a non-limiting example for a signature of the document. The signature is short (in terms of the memory space allocated for representing it) and allows for rapid determination of near candidates for duplicate indications. Thus, by the latter embodiment, applying the Union/Intersection operations on the bucket results is efficient in terms of the computation resources, thereby enabling relatively fast calculations in the case that the near duplicate indications need to be determined in respect of large portfolio of documents.

The description above with reference to certain embodiments, exemplified the case where all functions are bounded by a certain value. In accordance with certain other embodiments, the functions are bounded by different values max, min. For instance, m different functions are applied to a document d, and return m respective values, say $d_{rank\_1}$, $d_{rank\_2}, \ldots d_{rank\_m}$. In accordance with certain embodiments, those m values are inserted to a database, or a specific data structure. When there is a need to get all near duplicate candidates for document x, the corresponding m ranks (for m distinct functions), for this particular document x are calculated, say $e_{rank\_1}, e_{rank\_2}, \ldots e_{rank\_m}$. The candidates near duplicate documents d are such that such that $|x_{rank\_i} - d_{rank\_i}| \leq \delta_i(f_i, th)$, where $\delta_i(f_i, th) = \alpha(th) \cdot |max_i - min_i|$ for all $1 \leq i \leq m$ Note that in accordance with certain embodiments of the invention, different min and or max values may apply to two or more out of the m functions.

As readily arises from the description above, it is possible to determine in one cycle of calculation whether a document A is candidate for near duplicate to more than one other document.

In accordance with certain other embodiments, at least one of the functions has a different characteristic. For example the function is not bound by max and min values. For this function type said $\delta(f, th, A) = \alpha(th) \cdot max\, f(A)$.

Suppose that there are two functions: The first $f_1$ is the total number of words in a document, and the second $f_2$ is a classifier (ranging from 0 to 1). Suppose document_1 got the following ranks:

| $f_1$ | $F_2$ |
|---|---|
| 200 (words) | 0.63 |

The ranks will be inserted to table called NearDupeTable

Document_2 (constituting document A) got the following ranks:

| $f_1$ | $F_2$ |
|---|---|
| 220 (words) | 0.72 |

In accordance with certain embodiments, in order to find all near-duplicate document to document_2, the following SQL query is generated, but first $\delta(f, th, A)$ is set to the following values (for the specific case where $\delta(f_1, th, A) = f_1(A) \cdot \alpha(th)$ and $\alpha(th) = 1 - th$):

$\delta(f_1, th, A) = f_1(A) \cdot \alpha(th) = f_1(A) \cdot (1-th) = 220*(1-0.8) = 44$. In the case of number of words, this means that we are looking for documents that differ no more then 44 words.

$\delta(f_2, th, A) = f_2(A) \cdot \alpha(th) = 0.72 * \alpha(th) = 0.1$ ($\alpha$ is a function on the level of equivalence, 0.8 in this case). In this case $\alpha(th)$ may be $\alpha(th) = -0.7*th + 0.7 = 0.14$

```
SELECT documentID FROM NearDupeTable WHERE (f1 BETWEEN
220+44 AND 220-44) AND (f2 BETWEEN 0.72+0.1 AND 0.72-0.1)
```

As a result, document_1 with the respective function values 200 (falling in the range of 220–44 to 220+44) and 0.63 (falling in the range of 0.72–0.1 to 0.72+0.2), will be announced as candidate for near duplicate to Document_2.

Note that the invention is not bound by the specified two function types (i.e. a function bound by the min/max values or a function not bound by the min/max values).

Figure 14:
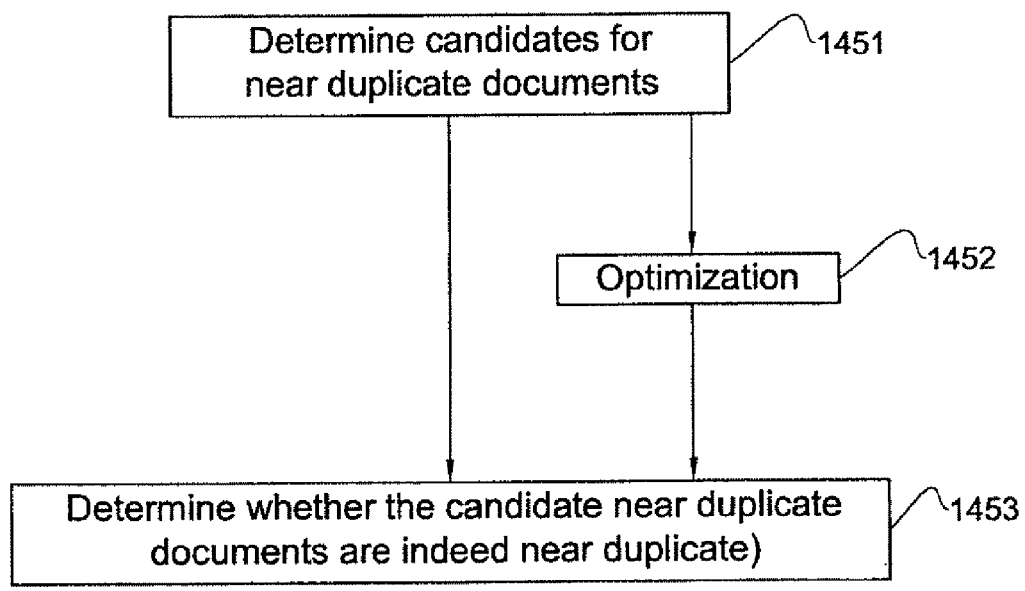
FIG. 14 illustrates a generalized flow diagram of operational stages in accordance with an embodiment of the invention.

Turning now to FIG. 14, there is shown a generalized flow diagram of operational stages in accordance with an embodiment of the invention;

Thus, having determined candidates for near duplicate indication (1451) in the manner described in detail above, then in accordance with certain embodiments of the invention, another phase is applied for providing a quantitative indication (more fine tuned) on the extent of proximity between the documents (which, in certain embodiments, calls for determining whether the candidate near duplicate documents are indeed near duplicate) (1452). To this end, a resemblance criterion between the candidates near proximate documents will be used and in the case that said criterion is met, the documents are announced as candidates for near duplicate.

For example, in accordance with certain embodiments, a known per se measure for determining resemblance, such as the one disclosed in U.S. Pat. No. 5,909,677 Broder (disclosing a technique for resemblance of documents), may be used. Note that this approach is resource consuming (in terms of computational resources), however it is applied, preferably, only to those documents classified as candidates for near duplicate indication in accordance with the embodiments described above (e.g. the one described with reference to FIGS. 12 and 13).

The fined tuned determination in accordance with e.g. the Broder measure, is determined by applying intersection between the candidate documents divided by union thereof meet a certain threshold (constituting by this example said resemblance criterion). By one example, the intersection is determined by calculating the number of shingles that are shared by both documents, and the union is determined by the number of shingles that reside in either documents. Thus, for instance, if the first document has 200 shingles and the second has 250, and it turns out that 100 shingles are shared by both documents, whereas the number of shingles that reside in either or both of the documents is 300, then the documents are near duplicate in 33.3%. It may be determined, for example, that only those documents having shared shingle portion that exceed a given threshold are classified as near duplicate.

Note that the invention is not bound by the specified Broder measure, for the second phase of calculation.

Thus, in accordance with one embodiment, if a resemblance criterion stipulates that documents need to be near duplicate in 90%, a first phase would lead to documents which are candidates for near duplicate (as described, e.g. with reference to certain embodiments of FIG. 3) and then a second phase would apply a more fine tuned (by one embodiment, slower) analysis in order to determine which documents (from among those announced as candidates for near duplicate indication in the first phase) are near duplicate at the desired extent (by this example 90%).

A certain optimization (1452 in FIG. 14) may be applied in order to expedite the second phase. Thus, in accordance with certain embodiments, this optimization would ignore those documents with shingle ratio that drops below the desired extent of near proximity. For instance, if the requirement for near duplicate is 90% and a certain document has 200 shingles, whereas the other has 250 shingles, the need to calculated the tedious intersection divided by union step is obviated, since the ration between the shingles is 0.8 (80% being lower than the desired level of 90%). In the context of FIG. 14, those documents which were discarded in the optimization stage (1452), will not be subject to the subsequent more fine tuned analysis of verifying the documents that are near duplicate (1453).

Note that certain documents which may be announced as candidates for near duplicate in the first course calculation phase, may eventually turn out to be not near duplicate if they do not meet the fine tuned quantity test, of the kind described, by way of example only, above.

In accordance with yet another embodiment of the invention, the system is characterized in learning capability. Thus, by a non-limiting example, a new function is used; say by way of non-limiting example, a classifier.

As may be recalled, a classifier distinguishes between two groups of documents, the two opposite training groups accommodate documents which were classified as near duplicate in the first phase, but did not meet the second more fine tuned phase. This situation may happen in certain cases where the first phase failed to duly identify near duplicate documents. For example, if the first phase determined that documents 1 and 2 are candidates for near duplicate, but it turns out that they are not classified as near duplicate in the second phase, then document 1 would be included in the first group and document 2 in the second group. If another pair, say document 5 and 8 have similar fate, then document 5 is added to group 1 (together with document 1) and document 8 is added to group 2 (together with document 2). Based on the two groups, a new classifier is generated. If the system includes i classifiers and near duplicate indication is provided if the documents meet the condition for every one of the i classifiers, then in accordance with this embodiment, the newly generated classifier constitutes the i+1's classifier. Since however the latter signifies documents which succeeded to meet the candidate for near duplicate test of the first phase and failed to meet the near duplicate test of the second phase, any new document which meets the condition for the i+1 classifiers, has a better likelihood to meet also the second more fine tuned test, thereby improving the quality of the results obtained by the first coarse (and fast) test.

In accordance with a more generalized approach of certain embodiments of the invention, there is provided applying at least one additional calculation phase in order to determine whether candidates of near duplicate documents meet a criterion for near duplicate documents, and applying a learning phase based on documents that are determined to be candidates for near duplicate, but did not meet the criterion for near duplicate documents.

The invention has been described with reference to certain embodiments by employing the condition $|f_i(A)-f_i(B)| \leq \delta_i(f, th, A)$, where $\delta_i$ is dependent upon at least $f$, th, A.

In accordance with certain other embodiments, the following condition was employed, $|f_i(A)-f_i(B)| \leq \delta_i(f, th)$, where $\delta_i$ is dependent upon at least $f$, th.

In accordance with certain other embodiments, the following condition was employed, $|f_i(A)-f_i(B)| \leq \delta_i(f, A)$, where $\delta_i$ is dependent upon at least $f$, A.

The invention is not bound by these specific embodiments. Thus, in accordance with a broader aspect of the invention, there is provided a system and method for determining that at least one object B is a candidate for near duplicate to an object A, comprising:

(i) providing at least two different functions on an object, each function having a numeric function value;

(ii) determining that at least one objects B is a candidate for near duplicate to an object A, if a condition is met, the condition includes: for any function $f_i$ from among said at least two functions, a relationship between results of the function when applied to the objects meets a given score.

In accordance with some of the embodiments described above, said relationship being $|f_i(A)-f_i(B)|$, and said score being $\delta_i(f, A)$, wherein $\delta_i$ is dependent upon at least $f$ and A, and wherein said condition is met if $|f_i(A)-f_i(B)| \leq \delta_i(f, A)$. In accordance with certain other embodiments described above, said score being $\delta_i(f, th)$, wherein $\delta_i$ is dependent upon at least $f$ and th, and wherein said condition is met if $|f_i(A)-f_i(B)| \leq \delta_i(f, th)$.

In accordance with certain other embodiments described above, said score being $\iota_i(f, th, A)$, wherein $\delta_i$ is dependent upon at least $f$ th and A, and wherein said condition is met if $|f_i(A)-f_i(B)| \leq \delta_i(f, th, A)$.

The invention can be used in various applications. Typical, yet not exclusive, examples of possible applications are document management, content management, digitization, legal, business intelligence, military intelligence, search engines results pre- and post-processing, archiving, source code comparisons, management of email servers, management of file servers, Spam detection. These exemplary applications (and/or others can be utilized in various marketing channels such as stand alone products, as a component (OEM), etc. The specified applications may be applied online or offline, as required.

Note that in certain embodiments, a known per se voice to text module (or other means) may be employed such that input objects (being voice data) are converted to text based documents which then undergo near duplicate analysis according to selected embodiment(s) of the invention as described in detail above.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Many specificities have been provided in the above description, however, these should not be construed as limiting the invention in any way. In addition, certain details have not been described, as they would be obvious to persons skilled in the art. The invention should be understood in terms of the appended claims.

The invention claimed is:

1. A non-transitory computer product including a data structure for organizing of a plurality of documents, and capable of being utilized by a processor for manipulating data of said data structure and for displaying selected data on a display unit, said data structure comprising:
   a plurality of directionally interlinked nodes, each node being directly linked to one or more documents, at least one of the nodes being directly linked to more than one document, each document having at least a header and a body text, each document having a fingerprint, all documents that are directly linked to a same node having a same fingerprint and identical normalized body text, and all documents that have a same fingerprint and identical normalized body text being directly linked to the same node;
   wherein for any first node of said nodes that is a descendent of a second node of said nodes, the normalized body text of each document that is directly linked to the first node is inclusive of the normalized body text of each document that is directly linked to the second node,
   wherein each fingerprint comprises a representation of the normalized body text of a corresponding document,
   wherein the normalized body text is the body text in which at least body text formatting and added characters are removed, and
   wherein said plurality of nodes are arranged in terms of more than one tree, each tree comprising at least one node from said plurality of directionally interlinked nodes, each tree comprising at least a root node and at least a leaf node, a root node being a node that is not a descendant of any other node, and a leaf node being a node that has no descendent nodes, a node not being prohibited from being both a root node and a leaf node, all nodes that are descendant from said root node are contained by said tree.

2. The non-transitory computer product of claim 1, wherein all documents having the same fingerprint and being directly linked to the same node have identical normalized subject parameter in said header.

3. The non-transitory computer product of claim 1 wherein said documents are emails.

4. The non-transitory computer product of claim 1 wherein said documents are emails and wherein all emails having the same fingerprint and being directly linked to the same node further having identical normalized attachments.

5. The non-transitory computer product of claim 1 wherein:
   said plurality of nodes are arranged in terms of at least a first tree and a second tree that contain a link to one another; and
   said link is indicative of the fact that said first tree contains a node that is directly linked to a document that is a near-duplicate of a document that is directly linked to a node in said second tree.

6. The non-transitory computer product of claim 1 wherein said documents are emails, and the computer product further comprises additional nodes that are directly linked to presumed documents.

7. The non-transitory computer product of claim 1, wherein the normalized body text of each document that is directly linked to the first node is inclusive of the normalized body text of each document that is directly linked to the second node, irrespective of whether a normalized subject parameter from a header of a document directly linked to the first node and a normalized subject parameter from a header of a document directly linked to the second node are identical.

8. The non-transitory computer product of claim 1, wherein said documents are emails, and all emails being directly linked to the same node further having the same normalized one or more attachments, the normalized body text of each email directly linked to the first node being inclusive of the normalized body text of each email that is directly linked to the second node, irrespective of whether a normalized attachment in an email directly linked to the first node and a normalized attachment in an email directly linked to the second node are identical.

9. The non-transitory computer product of claim 8 wherein said second node includes at least one attachment, which is not included in said first node and wherein said first node is identified by an inclusive minus flag.

10. The non-transitory computer product of claim 1, wherein said normalized body text includes the body text in which headers, footers, disclaimers and signatures are removed.

11. The non-transitory computer product of claim 1, wherein the data structure comprises a hierarchical data structure wherein the hierarchical data structure is identical irrespective of the order that the documents are processed.

12. A system comprising:
   a processor and associated display communicating with a data structure,
   the data structure comprising:
   a plurality of directionally interlinked nodes, each node being directly linked to one or more documents, at least one of the nodes being directly linked to more than one document, each document having at least a header and a body text, each document having a fingerprint, all documents that are directly linked to a same node having a same fingerprint and identical normalized body text, and all documents that have a same fingerprint and identical normalized body text being directly linked to the same node:
   wherein for any first node of said nodes that is a descendent of a second node of said nodes, the normalized body text of each document that is directly linked to the first node is inclusive of the normalized body text of each document that is directly linked to the second node,
   wherein each fingerprint comprises a representation of the normalized body text of a corresponding document,
   wherein the normalized body text is the body text in which at least body text formatting and added characters are removed,
   wherein said plurality of nodes are arranged in terms of more than one tree, each tree comprising at least one node from said plurality of directionally interlinked nodes, each tree comprising at least a root node and at least a leaf node, a root node being a node that is not a descendant of any other node, and a leaf node being a node that has no descendent nodes, a node not being prohibited from being both a root node and a leaf node, all nodes that are descendant from said root node are contained by said tree,
   wherein said plurality of nodes are arranged in terms of at least a first tree and a second tree that contain a link to one another, and
   wherein said link is indicative of the fact that said first tree contains a node that is directly linked to a document that is a near-duplicate of a document that is directly linked to a node in said second tree, the processor and associated display configured to manipulate data of said data structure and display selected data on a display unit, wherein said processor is further configured to display said first tree and a node from said second tree in close proximity on said display unit.

13. The system of claim 12 wherein said processor is configured to mark for said display unit an entire thread inclusively including all the nodes directly between a root node and given leaf node.

14. A system comprising:
a processor and associated display communicating with a data structure,
the data structure comprising:
a plurality of directionally interlinked nodes, each node being directly linked to one or more documents, at least one of the nodes being directly linked to more than one document, each document having at least a header and a body text, each document having a fingerprint, all documents that are directly linked to a same node having a same fingerprint and identical normalized body text, and all documents that have a same fingerprint and identical normalized body text being directly linked to the same node;
wherein for any first node of said nodes that is a descendent of a second node of said nodes, the normalized body text of each document that is directly linked to the first node is inclusive of the normalized body text of each document that is directly linked to the second node,
wherein each fingerprint comprises a representation of the normalized body text of a corresponding document,
wherein the normalized body text is the body text in which at least body text formatting and added characters are removed, and
wherein said plurality of nodes are arranged in terms of more than one tree, each tree comprising at least one node from said plurality of directionally interlinked nodes, each tree comprising at least a root node and at least a leaf node, a root node being a node that is not a descendant of any other node, and a leaf node being a node that has no descendent nodes, a node not being prohibited from being both a root node and a leaf node, all nodes that are descendant from said root node are contained by said tree,
the processor and associated display configured to manipulate said data structure and display selected data on a display unit, wherein said processor is further configured to compare text of two documents, each document having a fingerprint, said documents being directly linked to different nodes.

15. A system comprising:
a processor and associated display communicating with a data structure,
the data structure comprising:
a plurality of directionally interlinked nodes, each node being directly linked to one or more documents, at least one of the nodes being directly linked to more than one document, each document having at least a header and a body text, each document having a fingerprint, all documents that are directly linked to a same node having a same fingerprint and identical normalized body text, and all documents that have a same fingerprint and identical normalized body text being directly linked to the same node;
wherein for any first node of said nodes that is a descendent of a second node of said nodes, the normalized body text of each document that is directly linked to the first node is inclusive of the normalized body text of each document that is directly linked to the second node,
wherein each fingerprint comprises a representation of the normalized body text of a corresponding document,
wherein the normalized body text is the body text in which at least body text formatting and added characters are removed, and
wherein said plurality of nodes are arranged in terms of more than one tree, each tree comprising at least one node from said plurality of directionally interlinked nodes, each tree comprising at least a root node and at least a leaf node, a root node being a node that is not a descendant of any other node, and a leaf node being a node that has no descendent nodes, a node not being prohibited from being both a root node and a leaf node, all nodes that are descendant from said root node are contained by said tree,
the processor and associated display configured to manipulate said data structure and display selected data on a display unit, wherein said processor is further configured to display the header and the body text of a document, said document having a fingerprint and being directly linked to one of the nodes.

16. The system of claim 15 wherein at least one of said documents includes at least one member of a group that includes: signature, disclaimers, attachment notification, and at least one attachment, and wherein said processor is configured to suppress the display of at least one of said members.

17. The system of claim 15 wherein said document is an email and said processor is further configured to display one or more attachments of said email being directly linked to one of the nodes.

18. A system comprising:
a processor and associated display communicating with a data structure,
the data structure comprising:
a plurality of directionally interlinked nodes, each node being directly linked to one or more documents, at least one of the nodes being directly linked to more than one document, each document having at least a header and a body text, each document having a fingerprint, all documents that are directly linked to a same node having a same fingerprint and identical normalized body text, and all documents that have a same fingerprint and identical normalized body text being directly linked to the same node;
wherein for any first node of said nodes that is a descendent of a second node of said nodes, the normalized body text of each document that is directly linked to the first node is inclusive of the normalized body text of each document that is directly linked to the second node,
wherein each fingerprint comprises a representation of the normalized body text of a corresponding document,
wherein the normalized body text is the body text in which at least body text formatting and added characters are removed, and
wherein said plurality of nodes are arranged in terms of more than one tree, each tree comprising at least one node from said plurality of directionally interlinked nodes, each tree comprising at least a root node and at least a leaf node, a root node being a node that is not a descendant of any other node, and a leaf node being a node that has no descendent nodes, a node not being prohibited from being both a root node and a leaf node, all nodes that are descendant from said root node are contained by said tree, the processor and associated display configured to manipulate said data structure and display selected data on a display unit, wherein said processor is further configured to display a list of documents that are directly linked to leaf nodes, each of the documents having a respective fingerprint, wherein a leaf node comprises a node that has no descendant nodes.

* * * * *